(12) United States Patent
Fisher

(10) Patent No.: US 8,380,527 B2
(45) Date of Patent: Feb. 19, 2013

(54) SYSTEM AND METHOD FOR FRANCHISE, FINANCE, REAL ESTATE, AND SUPPLIER RELATIONSHIP MANAGEMENT

(75) Inventor: Nancy K. Fisher, Carlsbad, CA (US)

(73) Assignee: Euro-American International, Inc., Carlsbad, CA (US)

( * ) Notice: Subject to any disclaimer, the term of this patent is extended or adjusted under 35 U.S.C. 154(b) by 2045 days.

(21) Appl. No.: 10/113,568

(22) Filed: Apr. 2, 2002

(65) Prior Publication Data

US 2002/0188483 A1 Dec. 12, 2002

Related U.S. Application Data

(60) Provisional application No. 60/280,133, filed on Apr. 2, 2001.

(51) Int. Cl.
*G06Q 10/00* (2006.01)
(52) U.S. Cl. .......................................................... 705/1.1
(58) Field of Classification Search .................. 705/1, 1.1
See application file for complete search history.

(56) References Cited

U.S. PATENT DOCUMENTS

| | | | |
|---|---|---|---|
| 6,594,633 B1 * | 7/2003 | Broerman | 705/1 |
| 6,684,196 B1 * | 1/2004 | Mini et al. | 705/26 |
| 7,085,735 B1 * | 8/2006 | Hall et al. | 705/26 |
| 7,412,394 B2 * | 8/2008 | Hsuan et al. | 705/1 |
| 2002/0038280 A1 | 3/2002 | Levy | |
| 2002/0052814 A1 | 5/2002 | Ketterer | |
| 2002/0055898 A1 | 5/2002 | Burakoff et al. | |
| 2002/0062277 A1 | 5/2002 | Foster et al. | |

FOREIGN PATENT DOCUMENTS

| | | |
|---|---|---|
| EP | 1022669 A2 * | 7/2000 |
| JP | 2002-73986 | 3/2002 |

OTHER PUBLICATIONS

Informaiton on eFranchise.com, 2000, printed through www.archive.org.*

* cited by examiner

*Primary Examiner* — Naresh Vig
(74) *Attorney, Agent, or Firm* — Brooks Kushman P.C.

(57) ABSTRACT

An electronic system and method for Franchise, Finance, Real Estate and Supplier Management. Expedites the Franchise buying and selling process and provides: a shortened timeline; an integrated system for information; easing legal compliance; managing financing; managing real estate selection; and enhancing marketing. The present invention is provided by a Host (e.g., FAST TRACK) and typically used by Prospects, Companies, and their agents, but is not limited to these entities. The Prospects include entities (including individuals) that are interested in becoming a Franchisee, or are interested in services and goods necessary to become a Franchisee. The Companies include Franchisors, Finance Entities, and Real Estate Entities. The Finance Entities include Lenders, Loan Brokers, and Credit Reporting Agencies. The Real Estate Entities include Real Estate Owners and Real Estate Agents.

62 Claims, 29 Drawing Sheets

Prospect Registration
My Account                                                          Page 1 of 3 franchise.com
THE NAME SAYS IT ALL

| Member | Franchises | Loans | Locations | My Information | Contact Us | Logout |

My Account
(* = Required Field)

| | |
|---|---|
| Salutation: * | Ms. ▽ |
| First Name: * | Nancy |
| Middle Name: | |
| Last Name: * | Adams |
| Address: * | xxx |
| | |
| City: * | xxx |
| County/District: * | xxx |
| State/Prov: * | xxx |
| Zip/Postal Code: * | xxx |
| Country: * | United States ▽ |
| Phone: * (with area code) | xxx |
| Fax: (with area code) | xxx |
| Email: * (This item is very important) | nghanem@franchise.com |
| Password: * | |

| | |
|---|---|
| What's the best time to reach you? | Morning / Afternoon / Evenings / Weekends |
| Estimated Startup Date: | 3 Months / 6 Months / 1 Year / More Than 1 Year |

Are there any other Countries, States, Provinces, Counties, and Districts you would consider commuting to (or moving to) for your new franchise?      ○ Yes  ⊙ No If you are living near a county line or state border, please enter the locations you would consider:

Choice #1
City:

County/District:

State/Provinces:

https://www.franchise.com/fasttrack/memberupdate.asp                3/31/2002

FIG.19B

My Account                                            Page 2 of 3

```
                                              Countries:
                                              [Select One-->|▼]
                                              Choice #2
                                              City:
                                              [                ]
                                              County/District:
                                              [                ]
                                              State/Provinces:
                                              [                ]
                                              Countries:
                                              [Select One-->|▼]
```

| | |
|---|---|
| How much time will you devote to your business? | ⊙ Full-Time ○ Part-Time |
| | Ex: John Doe, Jane Doe |
| If you have a partner(s), please provide their First and Last Names: | [          ] △▽ |
| What Degrees have you earned? *<br>(To choose multiple items, hold the CTRL down as you make your selections.) | None<br>Middle School<br>High School<br>Associate's<br>Bachelor's<br>Master's<br>Doctorate<br>Medical<br>Law |
| Please provide your professional experience:<br>(To choose multiple items, hold the CTRL down as you make your selections.) | Accounting △<br>Art<br>Audio Visual Production<br>Auto Service<br>Building ▽ |
| Present Occupation: * | consultant |
| What types of sources will you use for investment funds?<br>(To choose multiple items, hold the CTRL down as you make your selections.) | Self<br>Partner<br>Family<br>Loan |
| How much can you comfortably invest in your business initially? * | Less than $5,000 △<br>$5,000 - $10,000<br>$10,000 - $20,000<br>$20,000 - $40,000<br>$40,000 - $60,000 ▽ |
| What is your approximate net worth? * | | https://www.franchise.com/fasttrack/memberupdate.asp                3/31/2002

FIG.19C

My Account　　　　　　　　　　　　　　　　　　　　　　　　　　　Page 3 of 3

(Net Worth = Assets − Liabilities)

| Less than $5,000 |
| $5,000 − $10,000 |
| $10,000 − $20,000 |
| $20,000 − $40,000 |
| $40,000 − $60,000 |

Do you wish to receive your franchise correspondence　　⊙ Yes　○ No
securely online? *
Note: Documents not delivered electronically will need to
be delivered by traditional mail.

[ Update My Information ]

| CLICK TO GO HOME | Your privacy is our TOP priority! |  |
| CONTACT US | (C) 2002 Franchise.com All Rights Reserved. Site designs by Brind.com | | https://www.franchise.com/fasttrack/memberupdate.asp　　　　　　　3/31/2002

FIG.19D

Company Registration
Franchise.com Admin Logon                                                      Page 1 of 3

 franchise.com
THE NAME SAYS IT ALL

Admin Home | Customers | Lists | Users | Site | Reports | Members | Logout
Customer Detail View          [Logon As This Advertiser]              Upd:

Personal

| Field | Value |
|---|---|
| Account #: | 9000 |
| Company Name: | UFOC Demonstration Account |
| Display Name: | UFOC Demonstration Account |
| Salutation: | Ms. |
| First Name: | Franchisor |
| Last Name: | |
| Address: | PO BOX 230928 |
| City: | Encinitas |
| State: | California |
| Postal Code: | 92023 |
| Country: | United States |
| Phone: | 1-760-943-0080  x |
| Fax: | 1-760-436-5387 |
| E-mail: | test@franchise.com |
| Password: | |

Account

Featured National Listing:   ○ Yes  ⊙ No
New Arrival:                 ○ Yes  ⊙ No
Select Franchise:            ○ Yes  ⊙ No

| Field | Value |
|---|---|
| Type Code: | Franchise |
| Worldwide: | US/Canada |
| Status: | Active |
| Tier Level: | Premier |
| Start Date: | 4/16/2001 |
| End Date: | 1/1/1900 |
| Backup Page: | 90009 | https://www.franchise.com/admin/customerdetail.asp?customerid=408&BegViewIndex=1...   3/31/2002

FIG.19F

| | |
|---|---|
| Franchise.com Admin Logon | Page 2 of 3 |

| | |
|---|---|
| Click-Thru ID: Financial | |
| Cash Required: | Cash Required: Not Applicable |
| Cash Required (MM): | $20,000 - $ 40,000 ▽ |
| Amount Financed: | Financing Available: Not Applicable |
| Net Worth: | Net Worth: Not Applicable |
| Franchise Fee: | |
| Total Investment: Info | 0 |
| Notes: | |
| Website: | http://www.franchise.com/site/advertise_listing_benifits.asp |
| Short Description: (100 char) | |
| Long Description: (250-500 char) | This Page has been set up for potential advertisers and their te of the Franchise.com proprietary Lead Tracking/Management/E-Dis System for which there is a Patent-Pending The Information learned viewing this system may be confidential, is intended only for th of the advertiser, and may be legally privileded. If you are a potential advertiser and desire access to this secure section of Franchise.com web site contact 1-760-943-0080 or e-mail |
| Member Requirements | |
| Experience: ☐ | No Experience |
| Other Type | |
| Other Type: ☐ | |
| Assets | |
| Assets: ☐ | 5000_large.jpg(8823 bytes), 5000_small.jpg(8823 bytes), 9000_CA_2001Jan26.PDF 900_MINI_Disclosure.PDF (9227 bytes), 9000_NonReg_2001Feb22.PDF (257230 bytes) Setup Log.txt (9506 bytes), lib.asp.from.anaheim (28299 bytes) |
| Classification | |
| Categories: ☐ | |
| SubCategories: ☐ | |
| Keywords: ☐ | |
| United States | |
| North East: ☐ | | https://www.franchise.com/admin/customerdetail.asp?customerid=408&BegViewIndex=1...    3/31/2002

FIG.19G

SYSTEM AND METHOD FOR FRANCHISE, FINANCE, REAL ESTATE, AND SUPPLIER RELATIONSHIP MANAGEMENT

This application claims priority from U.S. Provisional Application Ser. No. 60/280,133, filed Apr. 2, 2001. The entirety of that provisional application is incorporated herein by reference.

NOTICE OF COPYRIGHTED MATERIAL IN DISCLOSURE

A portion of the disclosure of this patent document may contain material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

1. Field of the Invention

The present invention relates generally to a sales and service support system allowing Franchise Entities, Finance Entities, Real Estate Entities, and Prospects to interact electronically.

The present invention relates specifically to a sale and service support system for assisting Franchise Entities (e.g., Franchise and licensing companies, Franchise unit owners, prospective Franchise buyer), Finance Entities (e.g., finance companies and equipment finance companies), Real Estate Entities (e.g., real estate owners, government development agencies, real estate agents, attorneys, and government regulatory agencies) and Prospects to interact electronically for purposes comprising: buying and/or selling of a new or existing Franchise; financing or refinancing a new or existing Franchise; finding a suitable commercial real estate site in which to open a new Franchise; and/or delivering, receiving, and sharing documents.

2. Related Art

FranchiseDocs.com (previously owned by FranData) provides a service related to a Uniform Franchise Offering Circular (UFOC) e-delivery service.

eMaximation provides a service related to a Prospect qualification system. Their partners, SalesForce.com and Best Strategies, provide a service related to contact management and ranking Franchise sites.

eFranchise.com provides a service that requires a Prospect to obtain a password in order to submit a request for Franchise information.

Background of the Technology

In response to the popularity of the Internet, and specifically the large number of individuals interested in learning about purchasing and operating a Franchise via the internet, the Franchise community has begun to adopt online sales and service techniques that have been successful in other fields. Marketing a Franchise poses many unique challenges. One of these challenges is a lengthy timeline (sometimes a year or longer) between the time a Franchisor communicates with a Prospect (a prospective Franchisee) for the first time, to the time that the Franchise is sold and a store is opened.

The key elements that typically take place during the Franchise buying process are as follows:

Lead qualification, interviews, application for the Franchise, obtaining a credit check and sometimes a background check on the Prospect, Prospect's due diligence based on review of government required issuance by the Franchisor of a disclosure document, and a visit to the Franchisor's headquarters.

Finding a business lender, applying for a loan, supplying Franchise information and a business plan.

Finding a location that meets the Franchisor's specifications and negotiating a contract.

Signing Franchise, loan, and real estate lease or purchase agreements.

Making building improvements.

Ordering and installing equipment and supplies.

Obtaining training in the Franchise system.

Hiring and training employees.

Pre-advertisement.

Opening for business.

Franchisor's typically generate Prospects from referrals, print advertising, trade shows, and the Internet.

Prospects searching for a Franchise typically use traditional means in their search, including: responding to print advertising; going to trade shows; using print Franchise directories; using brokers; contacting Franchisors directly; and (more recently) using the Internet. When searching on the Internet, Prospects generally have two options: a Franchisor's Web site, or an online Franchise directory.

Many Franchisors require Prospects to visit their headquarters. This visit is known as Discovery Day. At Discovery Day Prospects meet key executives, and learn about training programs, marketing programs, and Franchise system operations. Both the Franchisor and the Prospect conclude typically at this time if they want to move forward with a Franchise Agreement. A Franchise Agreement is signed either at Discovery Day if a Uniform Franchise Offering Circular (UFOC) has been previously delivered to the Prospect, or at least ten days after Discovery Day if a UFOC is delivered during Discovery Day.

There are several deficiencies in currently available systems and methods for assembling and delivering Prospects to Franchisors, Finance Entities, Real Estate Entities, and equipment and supply vendors.

Need to Shorten Timeline. Typically, six months will elapse from the time a Prospect is first received and the time a Franchise Agreement is signed. If a real estate 1 location is required, a year will often transpire due to the additional requirements of finding a loan and real estate.

Need for Integrated System for Information. Prospects do not have a central place with a full picture of the complex steps and stages required to buy a Franchise. Franchisors, Prospects, Finance Entities, Real Estate Entities, and service, equipment, and supply providers currently do not have a system to monitor and/or a way to participate with one another and with the Prospect in advancing the purchase and sale of a Franchise.

When a Prospect decides to request information or apply for a Franchise, a business loan, or a real estate location, much of the same data is required by the Franchisor, the Finance Entities, the Real Estate Entities, and the other interested parties. Prospects must complete the same information time and time again, often having to refer to their own files and records.

Franchisors, government agencies, and Franchise business suppliers traditionally maintain records in the form of paper, but electronic record keeping is becoming more common. Traditionally, a separate data store is used for each electronic record keeping application. Each department in a Franchise typically has a program that creates and maintains the records needed for individual purposes. The problem with this approach is that information is extensively duplicated.

There are other problems with application-specific data storage. Since a Prospect's information is entered in more than one file, any change in status must be entered into each file. Over time the accuracy and uniformity of the data deteriorates. In addition, the use of application specific data storage requires more data entry and more storage space.

In addition, the present system does not account for desired requirements for Prospects considering a Franchise. The Franchisors have financial and professional experience requirements for the Prospects. In addition to that requirement the Prospect must live in, or have plans to own a Franchise in a state (or other government entity, such as a foreign country) where the Franchisor has been approved to offer the Franchise for sale. The Franchisor may also want to limit the geographic area where their Franchise is marketed. For example, a Company may have sold certain regions in certain states, or not be interested in developing their Franchise in regions due to area demographics or the ability to provide support services. The initial request form the Prospect completes usually does not account for these desired limitations and does not pre-qualify the Prospect based on these criteria. Some of the Franchisors receive thousands of Prospects monthly, all having different amounts of personal and contact information. At this point, the Franchisors must: communicate further by phone and/or email with the Prospects to obtain additional information and to learn if the Prospects match their criteria; send additional sales information to Prospect; receive a formal application; and perform a credit check (and sometimes a background check) before approving the Prospect.

Need for Easing Legal Compliance. The Franchisors send brochures with Franchise applications to the Prospects primarily by surface mail. If interested in pursuing the Franchise, the Prospect completes the Franchise application and returns it to the Franchisor.

The Franchisors make credit checks and sometimes have a background check done to help them approve or disapprove the Prospect. If approved, the Prospect (either then or at time of meeting, but always before signing the Franchise Agreement) will be provided with a disclosure document. In the United States, this document is known as a Uniform Franchise Offering Circular (UFOC). A UFOC is usually 100 pages and may be as long as 400 pages. Other countries have similar disclosure documents.

In the United States, the Federal Trade Commission (FTC) sets the guidelines on the required inclusions within the UFOC, how it is delivered, and the manner of acknowledgment. The FTC-approved version is applicable for most of the United States, however, 15 states (known as registration states) have additional requirements and require that a state-approved UFOC version be sent to residents in those states. Franchisors are required to keep records of dates and versions of UFOCs sent to Prospects as well as the date acknowledged as received as evidenced by a signed receipt. As material changes occur in the Company, notices must be sent to all Prospects considering purchases that have already received a UFOC. When an existing owner has the rights to open multiple Franchise units, or when he/she wants to open an additional unit, the most current UFOC version must be delivered to the existing Franchise owner by the Franchisor and a signed acknowledgment must be received. Also, before an existing Franchise can be sold to a new purchaser, the new purchaser must complete the Franchise application, be approved by the Franchisor, and receive a UFOC and sign an acknowledgment of receipt. Each year within three months of the end of their fiscal year, the Franchisors must prepare an updated version of their UFOCs, which the registration states must approve. The Franchisors must also save and archive all versions of their UFOC documents.

Sometimes lawsuits arise during the term of a Franchise Agreement or the term thereafter, which requires the Franchisor to produce the exact version of the UFOC delivered to the buyer of the Franchise. This is often difficult for the Franchisors due to the manner in which old UFOC's are stored. UFOCs are often stored in offsite locations, onsite storage areas, old hard drives, floppy disks, and other assorted media.

The Prospects maintain their Franchise purchase records and UFOCs through the life of the Franchise ownership and years later. The Franchisors traditionally maintain Franchisee records ten years or longer, and government agencies approving the UFOCs usually keep versions twenty years from the date of each version's approval. Document storage for the Franchisors and government agencies has become a critical issue.

Managing Financing. When it seems probable the Franchise will be purchased, if financing is required, the Prospect is expected to seek and find a business loan to be used for working capital, equipment purchase, and/or real estate. The Prospects may also obtain financing from an equipment lender. Finding and receiving approval for a loan takes one to three months. After the Franchise has been purchased and opened for business its owner may decide to sell the Franchise or obtain new financing.

The Finance Entities usually receive requests for loans and loan applications through their network of local branches in a paper format, and make credit checks. Commercial real estate agents, commercial property managers, development agencies, and owners receive the Prospect's telephone calls or inquiries from signs postings, print advertising, and occasionally the Internet. The Prospect's inquiries are recorded by pen or pencil onto a paper record, and sometimes entered into a database. When the Prospect decides to negotiate a lease or purchase agreement, a paper lease application and lease agreement, or a paper version purchase agreement is delivered by fax, mail, or in-person to the Prospect for completion and return. Email is also being used more recently for transmitting documents. Upon receipt of a lease application, a credit check is made on the Prospect.

Managing Real Estate. When it seems probable the Franchise will be purchased, and if a real estate site is required, the Prospect is expected to seek and find a location meeting the site specifications and demographic requirements of the Franchise. The Prospects typically find these sites themselves or work with agents, property managers, and owners, developers, and development agencies to find and negotiate on the site. Site selection usually takes three or more months, depending upon the requirements of the Franchisor and market conditions.

Since the Prospects are generally not knowledgeable on how to find and select real estate based on the Franchisor's demographic requirements and their need to filter out Franchise locations already operating within their location of interest, many sites are usually submitted to the Franchisor for approval that do not meet the Franchisor's requirements. Often the Prospects drop out of the process out of frustration. Also, the existing Franchisees desiring to sell their businesses often forget that their replacement Franchise unit buyer must submit an application to the Franchisor, be approved by the Franchisor after a satisfactory credit check is made, and provide the replacement Prospect with a current version of the UFOC, and receive back a signed acknowledgment of receipt. The Prospect may decide not to continue after reviewing the UFOC, since additional transfer requirements may be involved, including training of the replacement Franchisee.

Enhancing Marketing. Persons in charge of marketing for the Franchisors are not provided a readily available status update about the Prospect's advancement towards purchasing the Franchise, finding financing, or finding real estate until the site is submitted to the Franchisor for approval.

In addition, the sales performance of Franchise development departments and lead generating sources, as well as advertising campaigns have historically not been analyzed and tracked effectively. A complete indication of sales performance has typically been available only after the sales campaigns are complete and the results of the campaigns are manually collected and analyzed. This typically requires a series of paper-based forms and ad hoc systems that generate relatively slow feedback to sales personnel. Thus, there is also a need to provide up-to-date, on-line sales summary reports for the Prospects through all online lead sources, and to report the status and stage of the Prospects during the buying, borrowing, real estate lease, and sales processes.

Summary of Needs. In short, there remains a need for: a shortened timeline; an integrated system for information; easing legal compliance; managing financing; managing real estate selection; and enhancing marketing. The Franchise community needs a system to expedite the Franchisor's buying and selling process while enhancing the Prospect's satisfaction.

SUMMARY OF THE INVENTION

It is thus an object of the present invention to provide an electronic system and method for Franchise, Finance, Real Estate and Supplier Management. This method and system expedites the Franchise buying and selling process. The method and system provide: a shortened timeline; an integrated system for information; easing legal compliance; managing financing; managing real estate selection; and enhancing marketing.

The present invention is provided by a Host (e.g., referred to in one embodiment as FRANCHISE.COM'S FAST TRACK, FRANCHISE FAST TRACK, MY FAST TRACK, or FAST TRACK) and typically used by Prospects, Companies, and their agents, but is not limited to these entities. The Prospects include entities (including individuals) that are interested in becoming a Franchisee, or are interested in goods and services necessary to become a Franchisee. The Companies include entities (including individuals) that are interested in providing goods and services to Franchise-related entities (e.g., Franchisees, Prospects, and other Companies). The Companies include Franchisors, Finance Entities, Real Estate Entities, and Other Entities. The Finance Entities include Lenders, Loan Brokers, and Credit Reporting Agencies. The Real Estate Entities include Real Estate Owners and Real Estate Agents. The Other Entities include equipment suppliers, soft good (paper) suppliers, distributors, architects, signage suppliers, advertising suppliers, and employee suppliers.

It is an object of the present invention to provide a tool for establishing a long term and broad relationship between the Prospect and the Company by allowing those in charge of a Franchise, loan, real estate or other product or service to access Prospect and Franchise-related information in a timely manner to advance the sales process. In some embodiments, this is referred to as FRANCHISE MATCHMAKER, FRANCHISE LOAN MATCHMAKER, or FRANCHISE SITE MATCHMAKER.

It is a further object of the present invention to provide standardized and stored information from internal and external sources into a central storage unit.

It is a further object of the present invention to provide assembled and retrieved information from a centralized database containing a high volume of Prospect, Franchise, demographic, finance, real estate, equipment and supply information to support marketing activities.

It is a further object of the present invention to quickly generate Franchise applications, credit reports, Franchise loan and equipment finance applications, and commercial property lease and purchase information and agreements.

It is a further object of the present invention to process UFOC requests and requirements, referred to in one embodiment as FRANCHISE E-DISCLOSURE.

It is a further object of the present invention to match Prospect and Franchisor's location criteria with available real estate. This is referred to in one embodiment as FRANCHISE SITE MATCHMAKER.

It is a further object of the present invention to allow the Prospect to rapidly determine if any of the matched real estate has space available, and if available learn, the property owners price and terms.

It is a further object of the present invention to provide viewing of the matched available real estate in a timely manner in the company of an Agent who has been provided with the site and requirement information by the system.

It is a further object of the present invention to provide speedy transmission of lending, financing, commercial lease and purchase agreements stored and the automatic insertion of the pertinent data required by applicant and recipient.

It is a further object of the present invention to provide quick generation and distribution lists of sales Prospects.

It is a further object of the present invention to provide an online tracking system for tracking the performance of sales campaigns and individual salespersons.

Is it is a further object of the present invention to match Prospect and Franchisor's criteria with available financing. This is referred to in one embodiment as FRANCHISE LOAN MATCHMAKER.

Additional objects, advantages and novel features of the invention will be set forth in the following description and will become apparent to those skilled in the art of reading this description or practicing the invention. The objects and advantages of the invention may be realized and attained by the appended claims.

BRIEF DESCRIPTION OF THE DRAWINGS

The present invention will become more clearly appreciated as disclosure is made with reference to the accompanying DRAWINGS, wherein:

FIG. 10A-D displays an exemplary process illustrating how location information is entered and a match run, as set forth in step 925 of FIG. 9.

FIG. 19A-19G displays exemplary screen shots of the present invention.

DETAILED DESCRIPTION OF THE INVENTION

The present invention meets these objectives by providing a system and method for assembling a comprehensive database from diverse sources and retrieving information from that database in a meaningful and practical way. The present invention is provided by a Host 170 (e.g., FAST TRACK) and typically used by Prospects 105, Companies 106, and their agents, but is not limited to these entities. The Prospects 105 include entities (including individuals) that are interested in becoming a Franchisee, or are interested in services and goods necessary to become a Franchisee. The Companies 106 include Franchisors 115, Finance Entities, and Real Estate Entities. The Finance Entities include Lenders 125, Loan Brokers 130, and Credit Reporting Agencies 150. The Real Estate Entities include Real Estate Owners 110 and Real Estate Agent 120. The Real Estate Entities can also include real estate managers, development agencies, and developers not holding title to the real estate. The system and method of the present invention is primarily, but not exclusively, useful for supporting large-scale marketing activities, especially for the Franchisors 115, the Finance Entities, and the Real Estate Entities.

Figure 1:
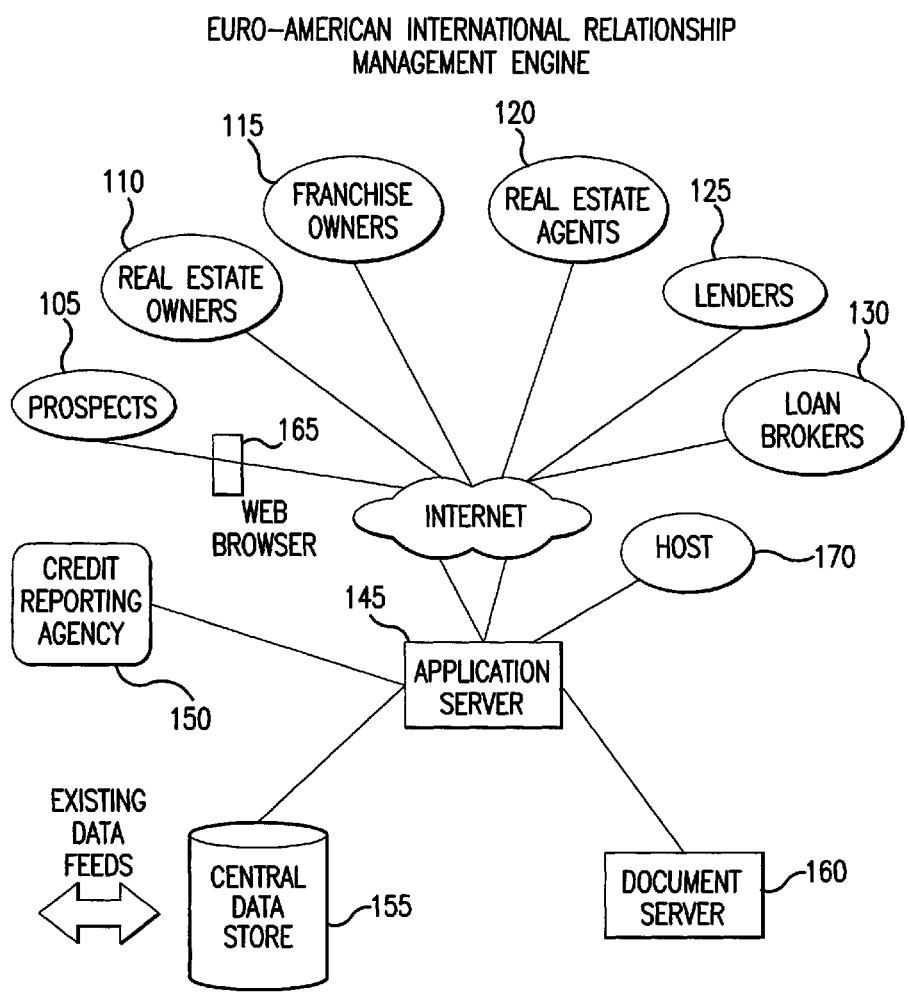
FIG. 1 displays an overview of the system's application architecture in an exemplary embodiment of the present invention.

FIG. 1—System Overview

FIG. 1 displays an overview of the application architecture of an exemplary embodiment of the present invention. FIG. 1 provides a visual picture of how Prospects 105 and Companies 106 (Franchisors 115, Finance Entities, and Real Estate Entities) interact with the Host 170. The system of the present invention includes: a Host Central Database 155; a Host Application Server 145; a Host Document Server 160; Web Browsers 165; and a Network such as the Internet 140.

The Host Central Database 155 underlies all of the applications of the present invention. The Host Application Server 145, the Host Document Server 160, the Web Browsers 165 are used to present, in a comprehensive way, the information stored within it.

Host Central Database. The Host Central Database 155 is designed to ensure the accuracy of information. The Host Central Database 155 also stores the information in a logical and organized way, by providing means for: scrubbing and standardizing incoming information; storing; building history; calculating status codes; maintaining tables; and calculating strategic flags. Fields in the Host Central Database 155 are instantaneously synchronized with information captured on a real time basis. In a preferred embodiment, the Host Central Database 155 stores, in one location, information from Prospects 105, Franchisors 115, Finance Entities (e.g., credit bureaus, finance companies), Real Estate Entities (e.g., Agents 120, managers and Real Estate Owners 110), census reports, shopping trend reports, and maps.

The Host Central Database 155 is housed on a Host Application Server 145 and includes a large repository of Prospect information, Company information, and demographic data. Information is fed into the database by the Prospects 105, the Companies 106 (e.g., the Finance Entities and the Franchisors 115) and their Agents 120. The data from these sources is stored in a uniform format. For this purpose, a uniform house holding or storage algorithm, a name and address standardization process, and a merge process may be used.

Thus, the Host Central Database 155 serves as a single central repository for storing all required Company information and Prospect information. As described hereinafter, the Host Central Database 155 can be used for a wide variety of customer service, financial analysis, and marketing purposes.

Host Application Server. The Host Application Server 145 acts as the conduit between what the user sees and what the Host Central Database 155 contains. A user is directed to the appropriate environment within the Host Application Server 145 and given the tools necessary to use the environment. The Host Application Server 145 includes several integrated components that are used to view Prospect information and manage Prospect contacts and relationships. Relationship management components support a comprehensive sales process. The Host Application Server 145 provides the following features: a relationship profile that allows appropriate staff members to view Prospect geographic locations; reported financial information the Franchisors 115 have provided, in addition to Franchise categories in detail and summary form; the Franchisor 115, Prospect, and Real Estate Entity requirements; a relationship-building feature that delivers prioritized email lists on-line and tracks results; a promotional suppression facility that provides information on which the Prospects 105 do not wish to be contacted by email or telephone about additional Franchisors 115 matching their previous interests and qualifications; and a Prospect history feature that displays Prospect aging summaries for active and inactive Prospects 105, and a Prospect status feature.

Host Document Server. The Host Document Server 160 stores all documents in an electronic archive and renders them when requested by the Host Application Server 145.

Web Browsers. The Web Browsers 165 comprise software that lets a user view documents and access files and software related to those documents.

Figure 2:
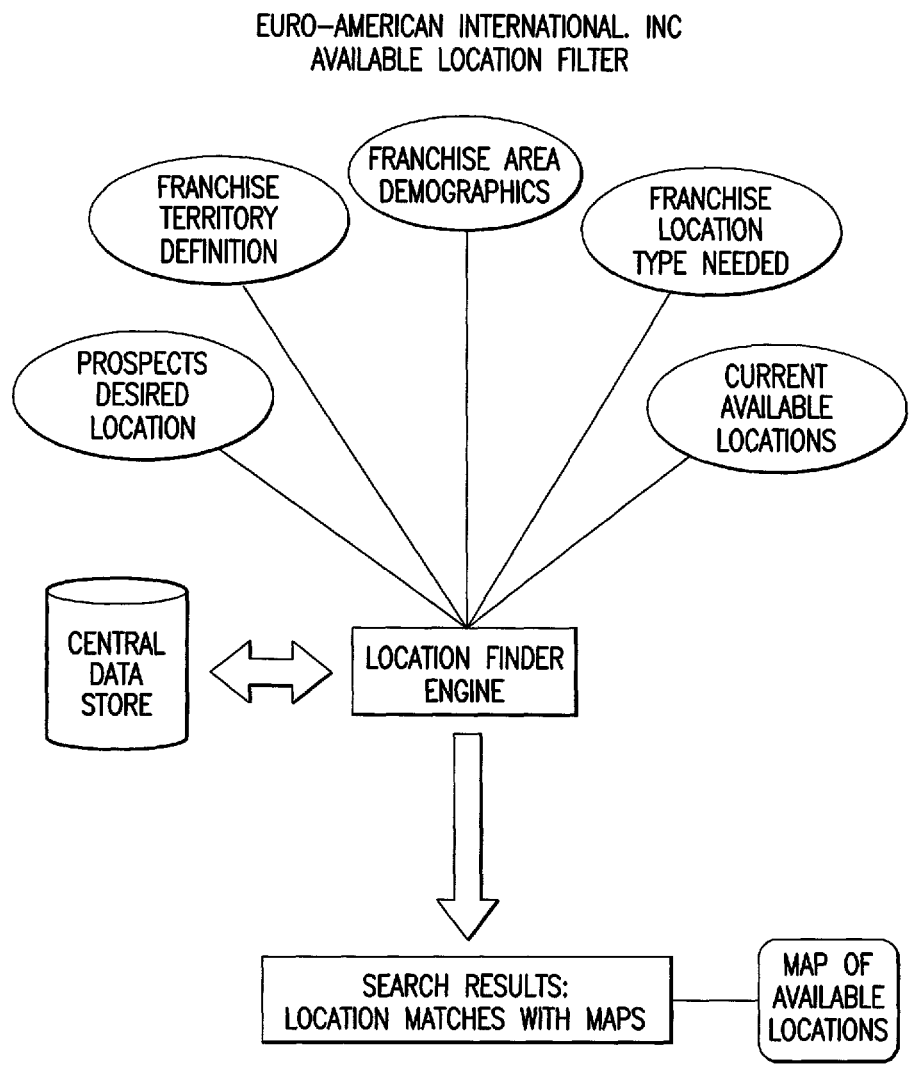
FIG. 2 displays a flow chart illustrating an overview of a method for the Prospect in an exemplary embodiment of the present invention.

FIG. 2—The Location Filter System

FIG. 2 displays the application architecture of the Location Filter System in an exemplary embodiment of the present invention. FIG. 2 provides a visual picture of how Prospects' Desired Location, Franchisors' Territory Definition, Franchisors' Area Demographics, Franchise Location Type Needed, and Current Available Locations correspond. The Location Filter System includes: a Central Data Store; a Location Finder Engine, a Search Results (Location Matches with Maps); and a Map of Available Locations.

Figure 3:
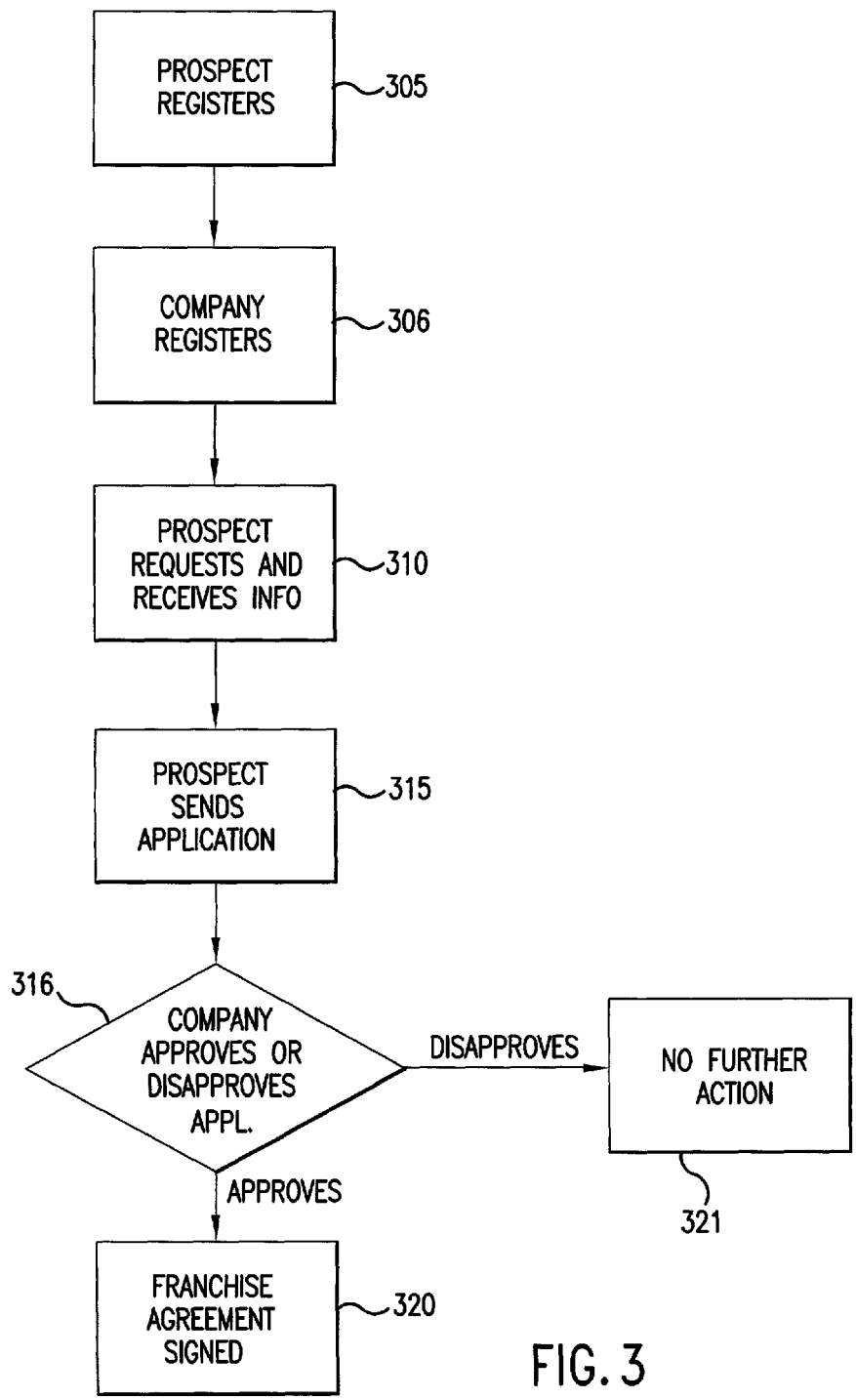
FIG. 3 displays a flow chart illustrating an overview of the method in an exemplary embodiment of the present invention.

FIG. 3—Prospect Method Overview

FIG. 3 displays a flow chart illustrating an overview of the method in an exemplary embodiment of the present invention.

In step 305, the Prospect 105 registers. In step 306, the Company 106 registers. (In an alternative embodiment, this order can be reversed, and the Company can register before the Prospect.) In step 310, the Prospect 105 requests and receives information from the Company 106. In step 315, the Prospect 105 submits an application and the Company 106 receives and approves or disapproves the application. If APPROVED, the Prospect 105 and the Company 106 sign a Franchise agreement in step 320. If DISAPPROVED, no further action is taken in step 321.

Figure 4:
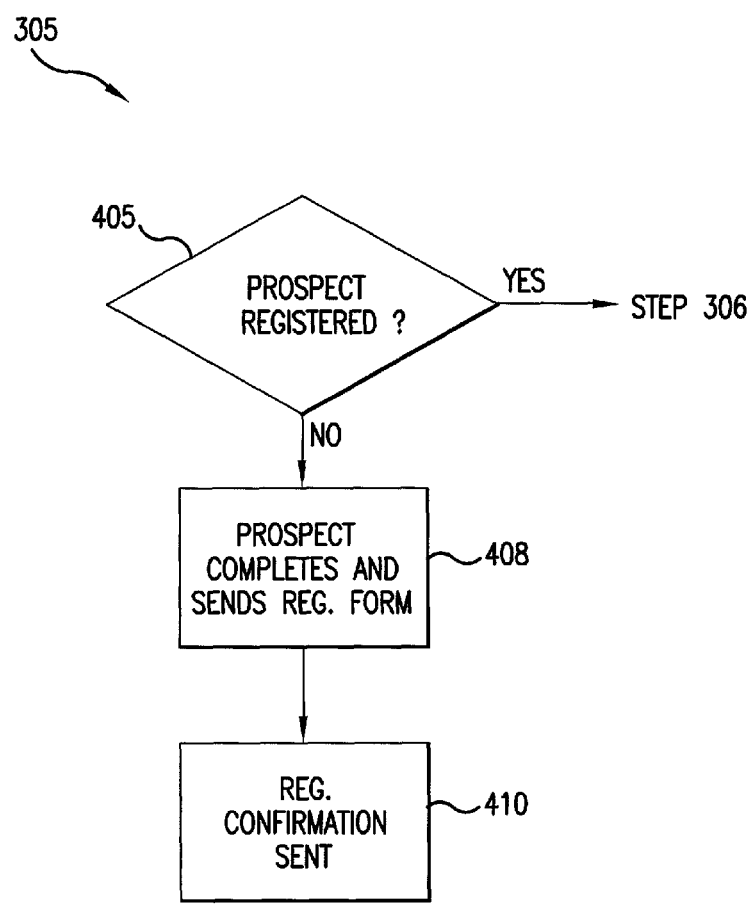
FIG. 4 displays an exemplary process illustrating how the Prospect Registers, as set forth in step 305 of FIG. 3.

FIG. 4—The Prospect Registers

FIG. 4 displays an exemplary process illustrating how the Prospect 105 registers, as set forth in step 305 of FIG. 3.

In step 405, it is determined whether the Prospect 105 is registered. (Note that in an exemplary embodiment, all Franchise.com Prospects 105 are already registered.) If NO, the process moves to step 408. If YES, the process moves to step 306.

In step 408, the Prospect 105 completes a Prospect Registration Form, comprising information about the Prospect. The Prospect Registration Form is a standard form on the FAST TRACK Web site or framed on the Company Web site (the Prospect 105 can be referred to the Prospect Information Form and the present invention directly from a Company's Web site). In an alternative embodiment, the Company can send an email to the Prospect 105 with a hyperlink to the Registration Form framed on the Company Web site. Depending on the Prospect type, the information comprises: Prospect identifying information; business loan and equipment financing information; real estate location information; and Prospect agreement to receive electronic delivery of documents. The Prospect Registration Form can be edited at any time.

A Prospect Account is created from the Prospect Information Form, and login information is then sent to the Prospect so the Prospect is able to login to the Prospect Account. The Prospect Account is stored and pre-populated when the Prospect 105 requests information from the other Companies 106. The Prospect 105 is able to edit the Prospect Account at any time, including automatic updating when companies send important disclosure documents (e.g., mini-disclosure and notices of material change).

In step 410, registration confirmations are sent. A confirmation request is sent by the Host 170 on behalf of the Company that runs the site where the Prospect 105 registered. For example, if the Prospect 105 registered with the Host 170 then the Prospect 105 would receive a registration confirmation from the Host 170. An email with the Prospect Information Form will also be sent to the Company 106. If the Prospect 105 registered with the Franchisor 115, then the Prospect 105 would receive a registration confirmation from the Host 170, on behalf of the Franchisor 115.

Figure 5:
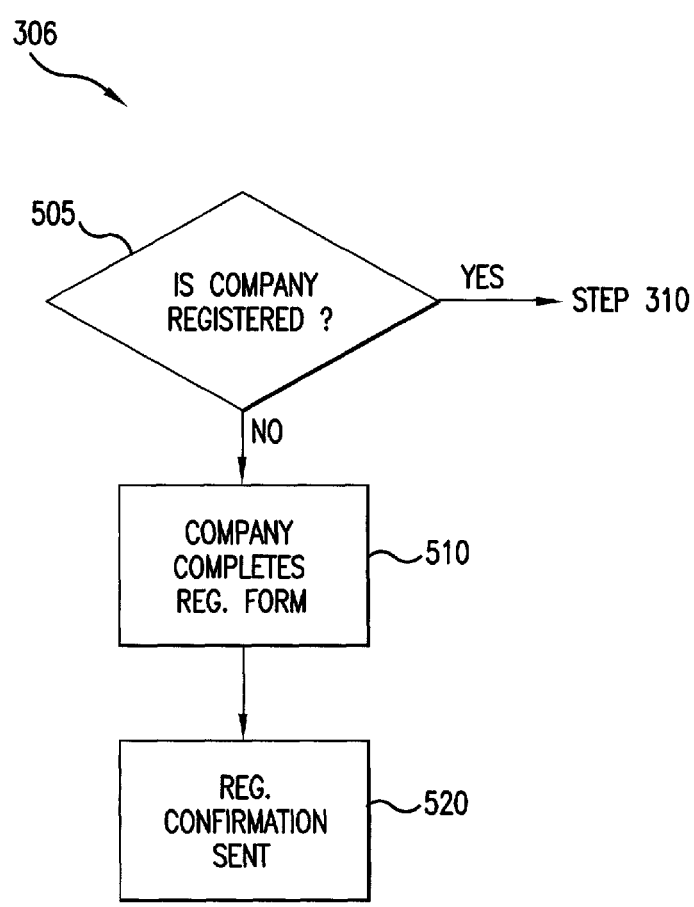
FIG. 5 displays an exemplary process illustrating how the Company registers, as set forth in step 306 of FIG. 3.

FIG. 5—Company Registers

FIG. 5 displays an exemplary process illustrating how the Company 106 registers, as set forth in step 306 of FIG. 3.

In step 505, it is determined whether the Company 106 is registered. If NO, the process moves to step 510. If YES, the process moves to step 310 of FIG. 3.

In step 510, the Company 106 completes a Company Information Form. The Company Information Form can comprise the following information: identifying information; geographic target market information; product or service category information; agreement to receive electronic delivery of documents; agreements, images, drawings to be stored with the Host 170; and links to lead records and online documents. The Company 106 is able to edit the Company Information Form at any time.

A Company Account is created from the Company Information Form and stored. The Company Account is stored and pre-populates when the Prospect 105 or the Host 170 requests information. The Company 106 is able to edit the Company Account at any time. For example, the Franchisor 115 can update online documents; activate and inactivate UFOC versions stored with the Host 170; update and/or deactivate auto-response messages sent to new Prospects 105; and change Franchise account information. In addition, the Company Account can be automatically changed and updated to include important disclosure documents (e.g. mini-disclosure, and notices of material change) agreements, images, and drawings stored with the Host 170. Furthermore, the Franchisor 115 can add new Prospect information.

In step 520, Registration Confirmations are sent. A Registration Confirmation will be sent to the Company 106. An email with the Company Information Form and the Company Account information will also be sent to the Host 170.

In an alternative embodiment, a fee is paid by the Company 106. This can be paid at any time by processing a credit card, or by paying an invoice that is sent to the Company 106.

Figure 6:
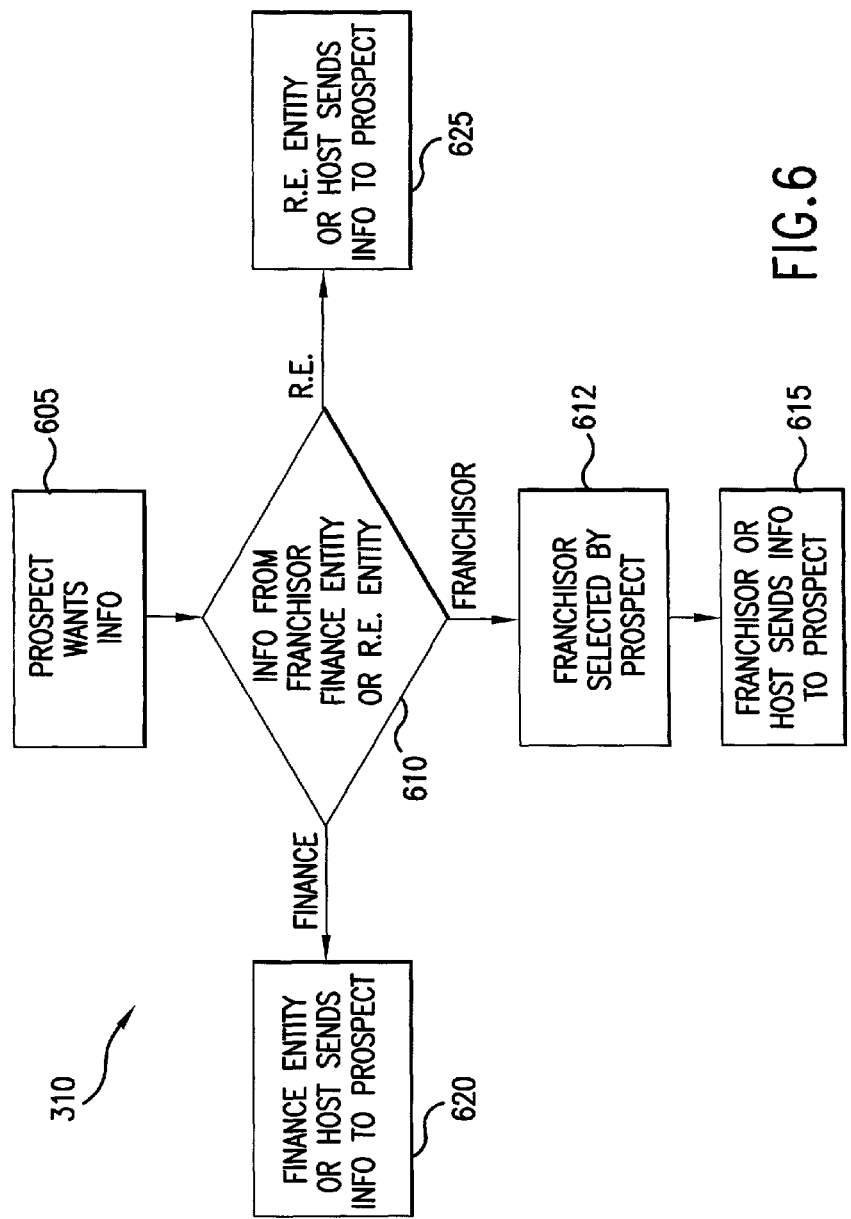
FIG. 6 displays an exemplary process illustrating how the Prospect request and receives information, as set forth in step 310 of FIG. 3.

FIG. 6—Prospect Requests and Receives Information

FIG. 6 displays an exemplary process illustrating how the Prospect 105 requests and receives information, as set forth in step 310 of FIG. 3.

In step 605, the Prospect 105 wants information about a Company 106. Once this happens, a Prospect Account is created by the Host 170 for the Prospect. Electronic events related to the Prospect 105 are stored in the Prospect Account and the Company Account, which both include a Report Log. The Report Log maintains a log of all communications and documents sent. The Franchisor 115 can log into the Company Account to review and update names, email addresses, and other information related to the Company Account. The Company Account can be automatically changed and updated to include important disclosure documents, mini-disclosure, and notices of material change.

In step 610, it is determined whether the information wanted is from the Franchisor 115, the Finance Entity, or the Real Estate Entity.

If the request relates to the Franchisor 115, the Prospect selects a Franchisor 115 in step 612. The Host 170 or the Franchisor 115 sends the information request to the Prospect in step 615.

If the request relates to the Finance Entity, the Host 170 or the Finance Entity sends the information (e.g., a quote) to the Prospect 105 in step 620. More information on an exemplary embodiment related to the Finance Entity process is detailed below.

If the request relates to the Real Estate Entity, the Real Estate Entity or the Host 170 sends the information to the Prospect 105 in step 625. More information on an exemplary embodiment related to the Real Estate Entity process is detailed below.

The request and the requested information can go back and forth several times before the Prospect 105 has the information desired from the Company 106.

Figure 7:
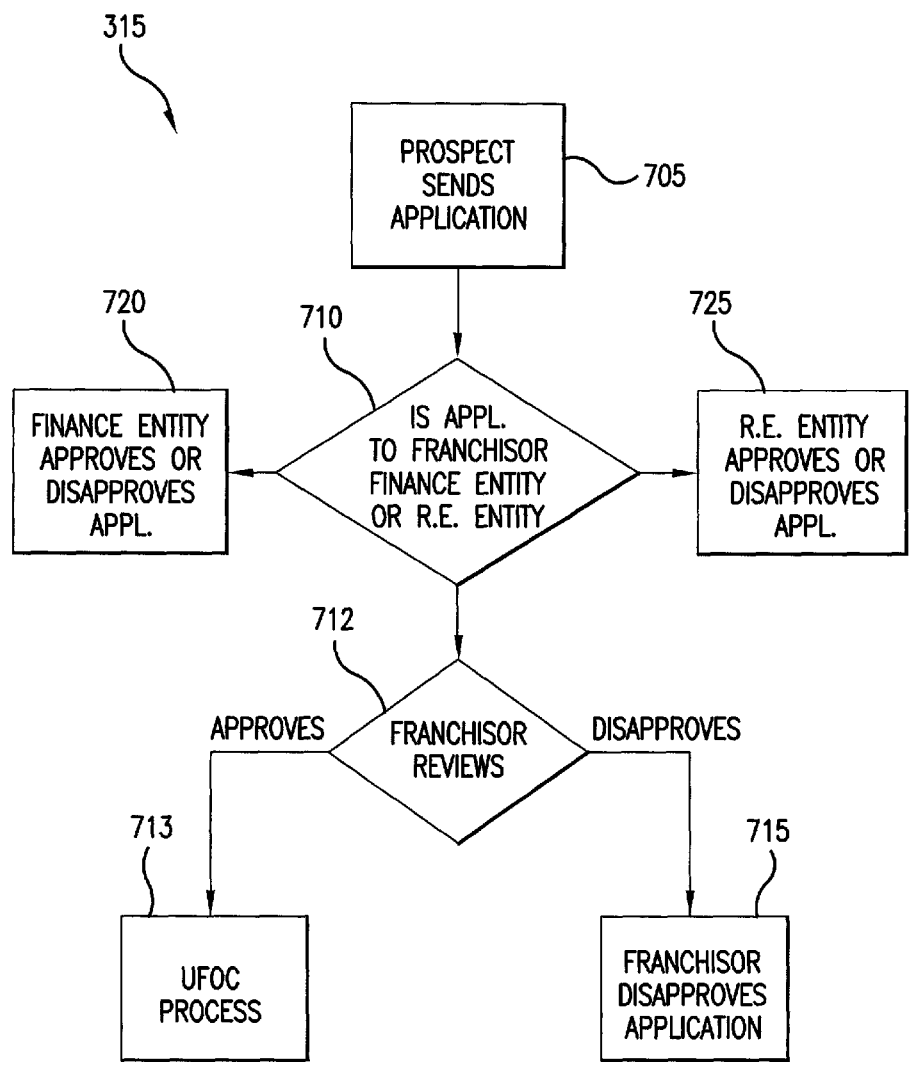
FIG. 7 displays an exemplary process illustrating how the Prospect sends an application, and how the Company receives and approves or disapproves the application, as set forth in step 315 of FIG. 3.

FIG. 7—Prospect Submits Application

FIG. 7 displays an exemplary process illustrating how the Prospect 105 sends an application, and how the Company 106 receives, and approves or disapproves an application, as set forth in step 315 of FIG. 3.

In step 705, the Prospect 105 sends an application.

In step 710, it is determined whether the application is sent to the Franchisor 115, the Finance Entity, or the Real Estate Entity. If the application is sent to the Franchisor 115, the Franchisor 115 reviews the application in step 712, and if approved follows the required UFOC process in step 713 (as set forth in FIG. 8 below), or disapproves the application in step 715. If the application is sent to the Finance Entity, the Finance Entity reviews and approves or disapproves the application in step 720. If the application is sent to the Real Estate Entity, the Real Estate Entity reviews and approves or disapproves the application in step 725.

Figure 8:
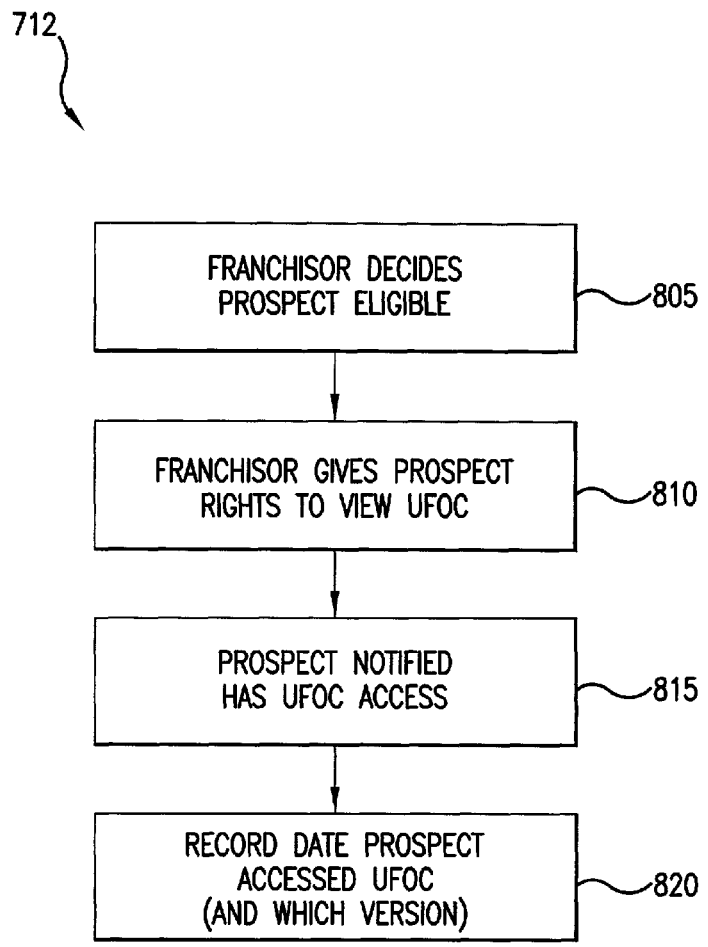
FIG. 8 displays an exemplary process illustrating how the UFOC Process is completed, as set forth in step 712 of FIG. 7.
Figure 9A:
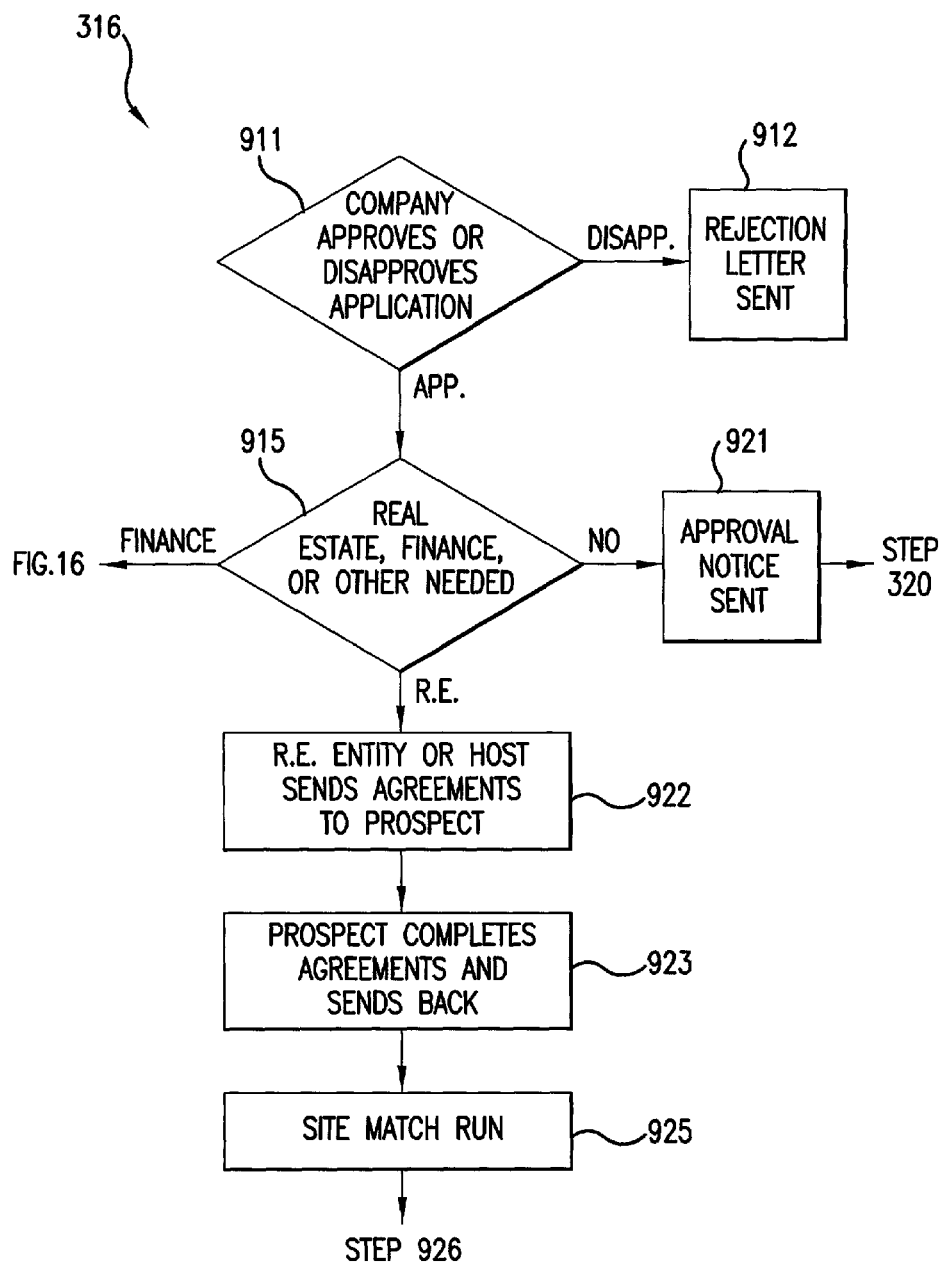
FIG. 9A-D displays an exemplary process illustrating how the Company approves or disapproves an application, as set forth in step 316 of FIG. 3.
Figure 9B:
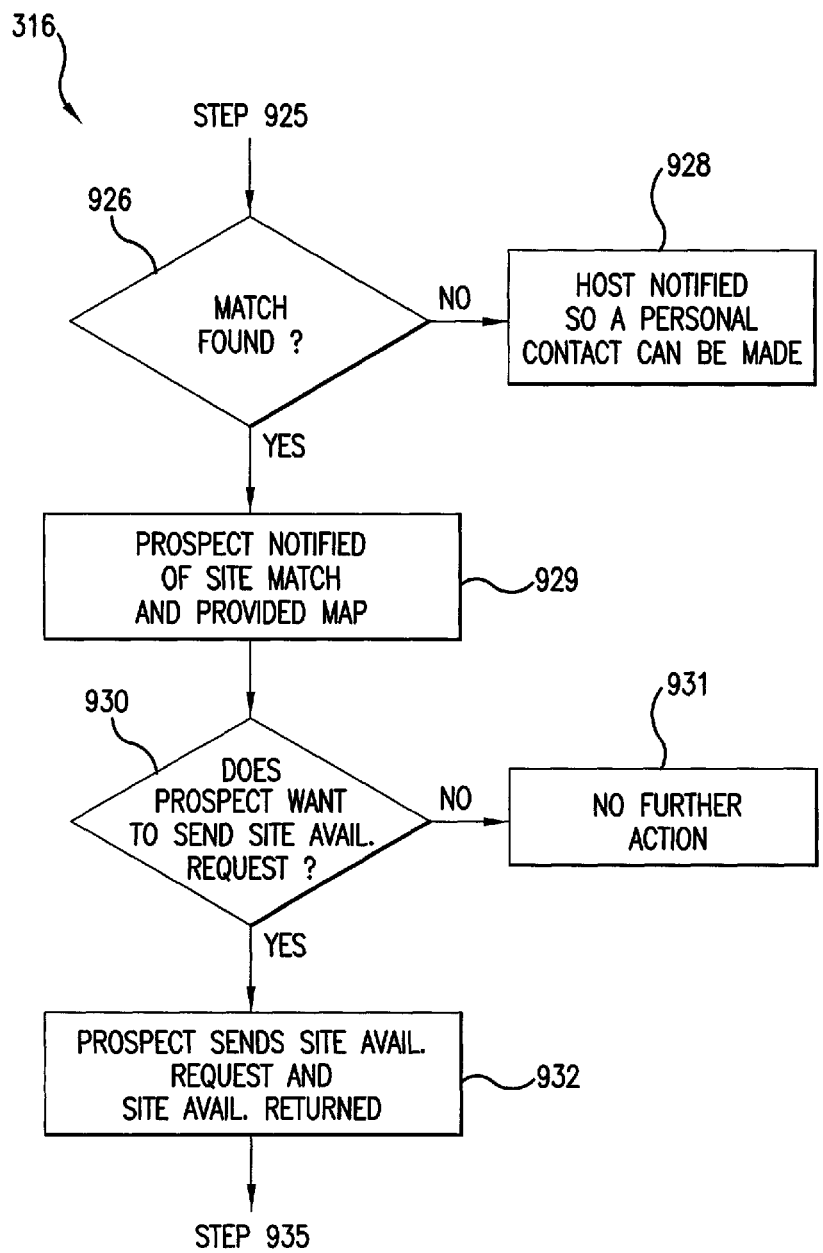
Figure 9C:
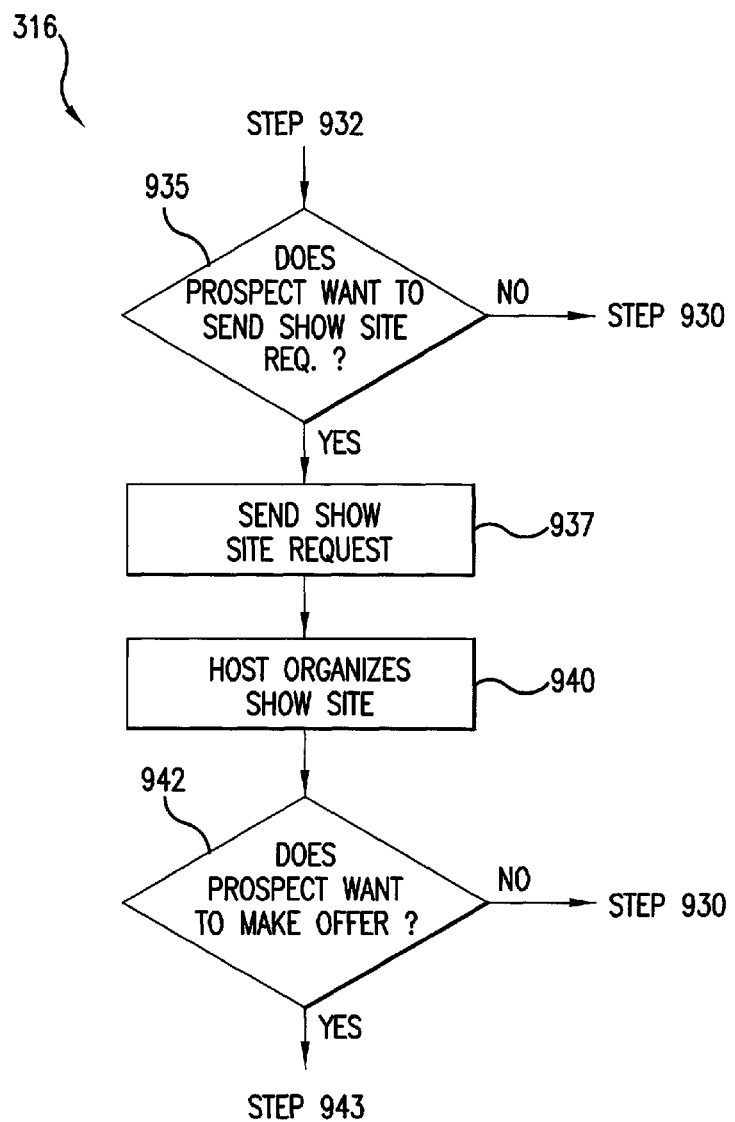
Figure 9D:
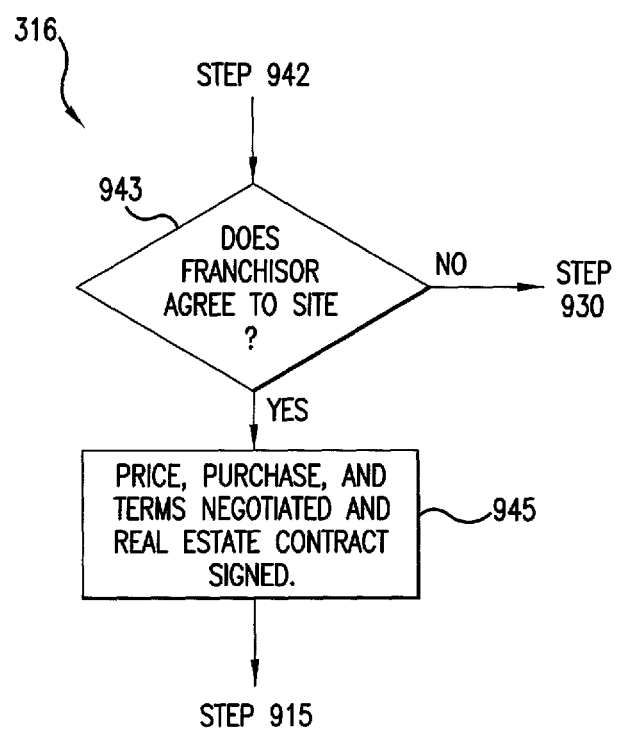

FIG. 8—UFOC Process

FIG. 8 displays an exemplary process illustrating how the UFOC Process is completed, as set forth in step 712 of FIG. 7.

In step 805, the Franchisor 115 decides whether the Prospect 105 is eligible to apply for the Franchise. In step 810, the Franchisor 115 gives the Prospect 105 rights to view the UFOC. In step 815, the Prospect 105 is notified that it has access to the UFOC. The Prospect 105 has already agreed to receive this electronic receipt. In step 820, the date the Prospect 105 was given UFOC access, and the version the Prospect 105 is allowed to access, is recorded.

FIG. 9—Company Receives Prospect Request and Sends Information

FIG. 9 (comprising FIGS. 9A, 9B, 9C, and 9D) displays an exemplary process illustrating how the Company 106 approves or disapproves the Prospect's application, as set forth in step 316 of FIG. 3.

In step 911, the Company 106 approves or disapproves the application.

If DISAPPROVED, the Company 106 sends the Prospect 105 a rejection letter in step 912. If APPROVED (to make the approval or disapproval decision, multiple communications may take place), the process moves to step 915, where it is also determined if real estate, finance, or other services or products are needed.

If NO, the Company 106 sends an approval notice to the Prospect 105 in step 921. The process then moves to step 320 of FIG. 3. If YES, the process moves to step 922, where the Real Estate Entity or the Host 170 sends agreements to the Prospect 105. In step 923, the Prospect 105 completes and sends agreements back to the Real Estate Entity. (Multiple communications can go back and forth and multiple agreements can be signed during this process.) The process then moves to step 925.

In step 925, a Site Match is run. More detail on step 925 is set forth in FIG. 10. In step 926, it is determined if a Match is found. If NO, the Host 170 is notified in step 928 so a personal contact can be made. If YES, the process moves to step 929.

In step 929, the Prospect 105 is notified of the site match and provided the map. In step 930, the Prospect 105 receives the Site Match information and it is determined if the Prospect 105 wants to send a Site Availability Request to the appropriate Real Estate Entity. If NO, no further action is taken in step 931. If YES, the Prospect 105 sends a Site Availability Request in step 932 and the Site Availability is returned. More detail on step 931 is set forth in FIG. 11.

In step 935, it is determined whether the Prospect 105 wants to send a Show Site Request. If NO, the process moves back to step 930, where the Prospect 105 can send a Site Availability Request for another site. If YES, a Show Site Request is sent to an appropriate Real Estate Entity (e.g., an Agent 120) in step 937. In step 940, the Host 170 organizes the showing of the site. More detail on step 940 is set forth in FIG. 12.

In step 942, after the property has been shown, it is determined if the Prospect 105 wants to make an offer on the property.

If the answer to step 942 is NO, the process moves back to step 930, where the prospect 105 can send a Site Availability Request for another site. If the answer to step 942 is YES, it is determined if the Franchisor agrees to the site location in step 943?

If the answer to step 943 is NO, the process moves back to step 930, where the prospect 105 can send a Site Availability Request for another site. IF the answer to step 943 is YES, the Prospect 105 and the Real Estate Entity (e.g., an Agent 120) negotiate a price in step 945. Further information on step 945 is set forth in FIG. 14.

FIG. 10—Site Match

Figure 10A:
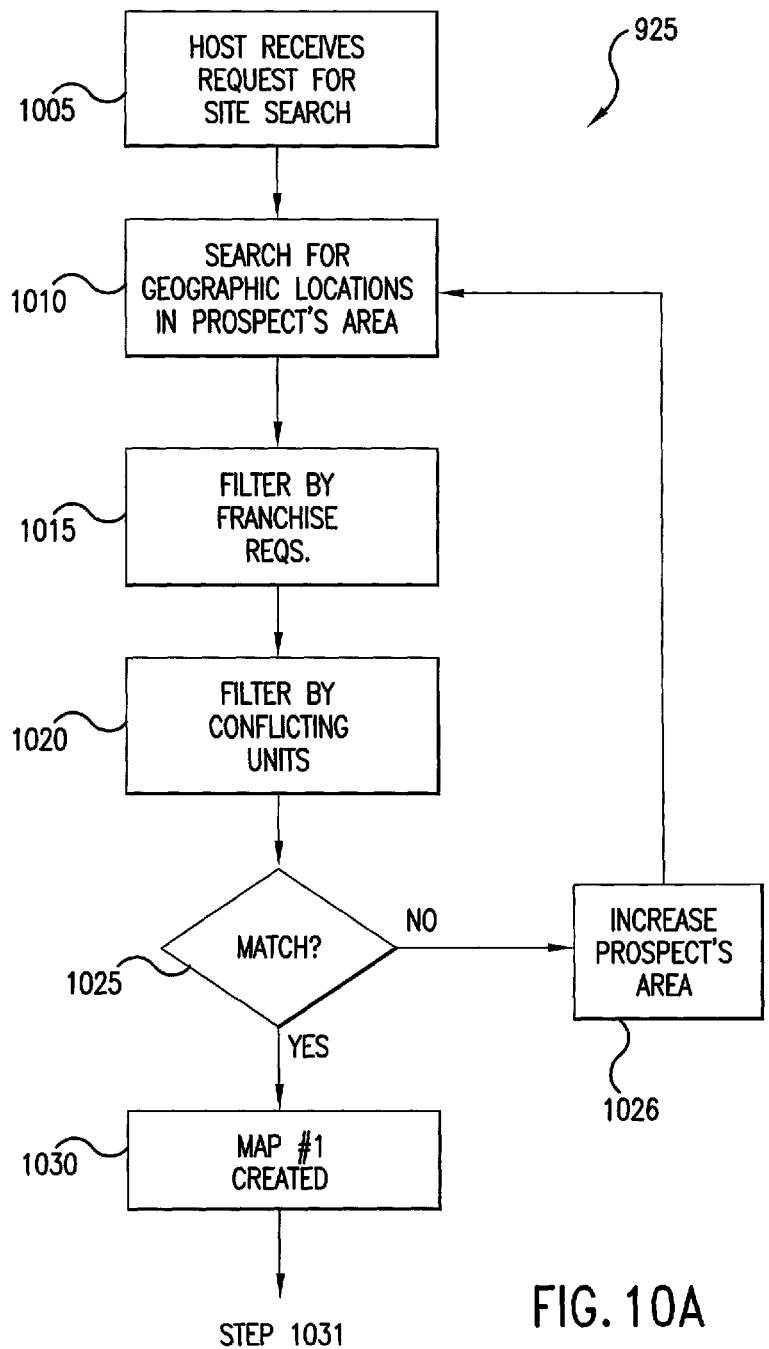
Figure 10B:
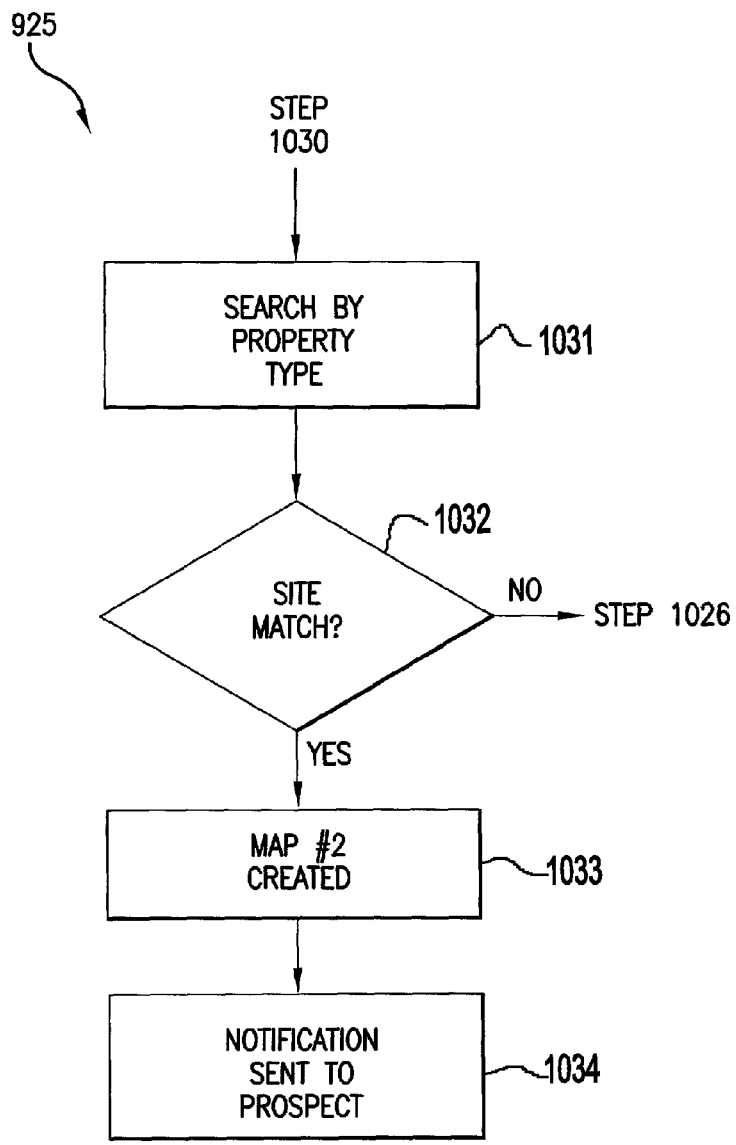

FIG. 10, comprising FIGS. 10A and 10B, displays an exemplary process illustrating how the location information is entered and a match is run, as set forth in step 925 of FIG. 9.

In step 1005, the Host 170 receives a request for a Site Search from the Prospect. In step 1010, a search is made for geographic locations in Prospect's area, based on a selected radius. (The real estate has already been registered with the Host 170.) These records are called location matches.

In step 1015, the locality matches are filtered by the Franchisor's requirements (demographics matches against and government census data) for locality/requirement matches. In step 1020, the locality/requirement matches are filtered by the Franchise territory restrictions and existing units to get locality/requirement/non-conflicting matches. (In other words, the locality/requirement matches are compared to the Franchisor's current unit locations. If a Franchise current unit exists within a predetermined radius of a locality/requirement match, that locality/requirement match is filtered out).

In step 1025, it is determined if matches were found. If NO, the Prospect's area is increased in step 1026, and then the process goes back to step 1010, and a new Site Search is run with a wider locality radius. If YES, the process moves to step 1030, where Map #1 is created. Map #1 comprises a map marking locations where a particular site could be put.

In step 1031, a property type search is made. In step 1032, it is determined if there is a match. If NO, the process moves back to step 1026. If YES, the process moves to step 1033, and Map #2 is created. Map #2 comprises a map marking locations of actual registered real estate. In step 1034, the notification and maps are sent to the Prospect 105.

Figure 11:
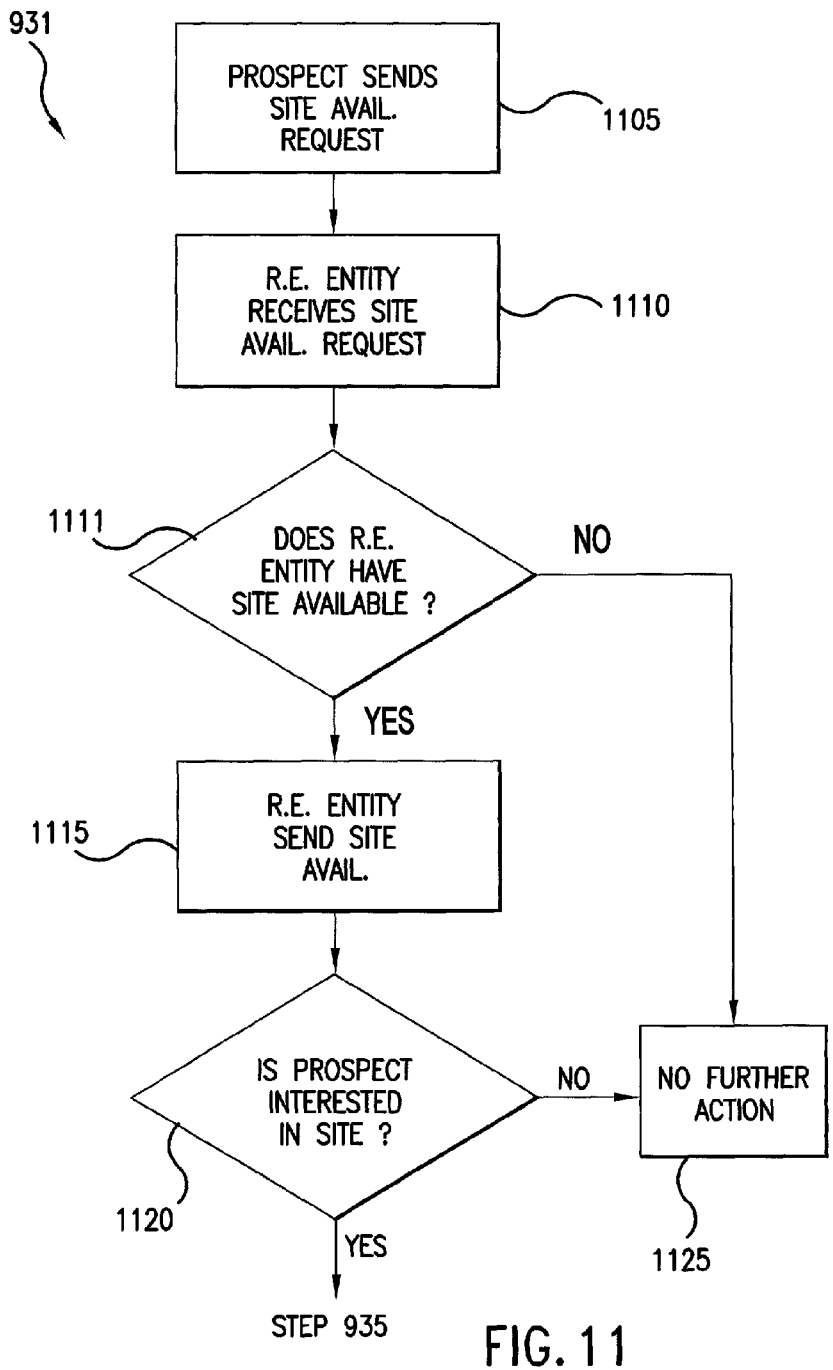
FIG. 11 displays an exemplary process illustrating how the Site Availability Request is submitted, as set forth in step 931 of FIG. 9.

FIG. 11—Site Availability Request

FIG. 11 displays an exemplary process illustrating how the Site Availability Request is submitted, as set forth in step 931 of FIG. 9.

In step 1105, the Prospect 105 sends a Site Availability Request, comprising the required space size, the site configuration, and a reply request if space is now or soon to be available. In step 1110, the Real Estate Entity receives the Site Availability Request from the Prospect.

In step 1111, it is determined if the Real Estate Entity has an available site. If NO, no further action is taken in step 1125. If YES, the process moves to step 1115.

In step 1115, the Real Estate Entity sends the Prospect 105 the Site Availability, comprising a property description, a Real Estate Owner 110, asking price, additional costs, required contract terms, and site availability date. A property ID and event is stamped into the Prospect Account, the Franchisor's Company Account, and the Real Estate Entity's Company Account. In addition, emails are sent to the Prospect Account and the Franchisor's Company Account.

In step 1120, it is determined if the Prospect 105 is interested. If NO, no action is taken in step 1125. If YES, the process moves to step 935.

Figure 12:
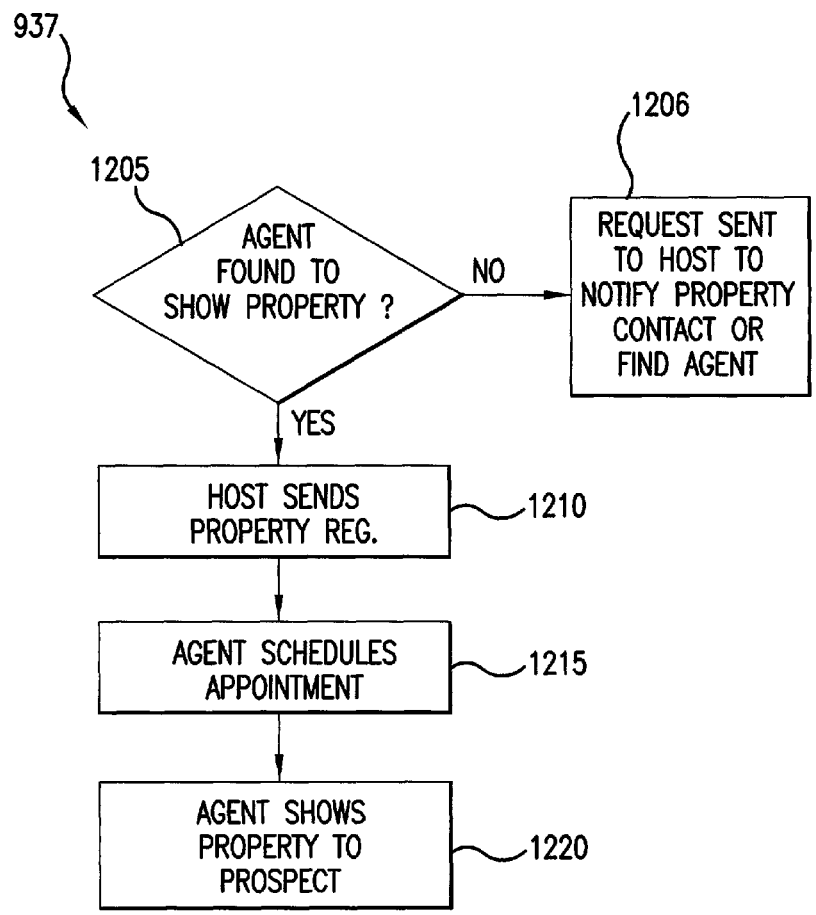
FIG. 12 displays an exemplary process illustrating how the Show Request is submitted, as set forth in step 937 of FIG. 9.

FIG. 12—Show Request

FIG. 12 displays an exemplary process illustrating how the Show Request is submitted, as set forth in step 937 of FIG. 9.

In step 1205, it is determined if an Agent 120 can be found to show the property. Further details on step 1205 are set forth in FIG. 13. (The real estate agent has already been registered with the Host 170.) If NO, the process moves to step 1206, where a notification is sent to the Host to find an agent or notify the Property Contact (e.g., Owner) directly. If YES, the process moves to step 1210.

In step 1210, the Host 170 sends the Agent 120 a Prospect Registration, which is required for real estate commission purposes. The Prospect Registration includes: Prospect contact information; Franchisor space requirements; real estate contact information for available property; and availability terms and conditions. Map #2 will also be provided. If the real estate Agent 120 is a licensed real estate broker having commission sharing arrangements with Real Estate Owners 110 and/or Agents 120, then that fact and the terms agreed to will be referenced in the Prospect Registration.

In step 1215, the Agent 120 schedules an appointment with the Prospect. In step 1220, the Agent 120 shows the property to the Prospect.

In an alternative embodiment, if the process moves to step 1206, where the Host 170 notifies the Property Contact, steps 1210, 1215, and 1220 can be done by having the Host 170 deal directly with the Property Contact (e.g., the Owner), acting as the Agent 120. In addition, all other services performed by the Agent 120 can be done directly by the Host 170.

Figure 13:
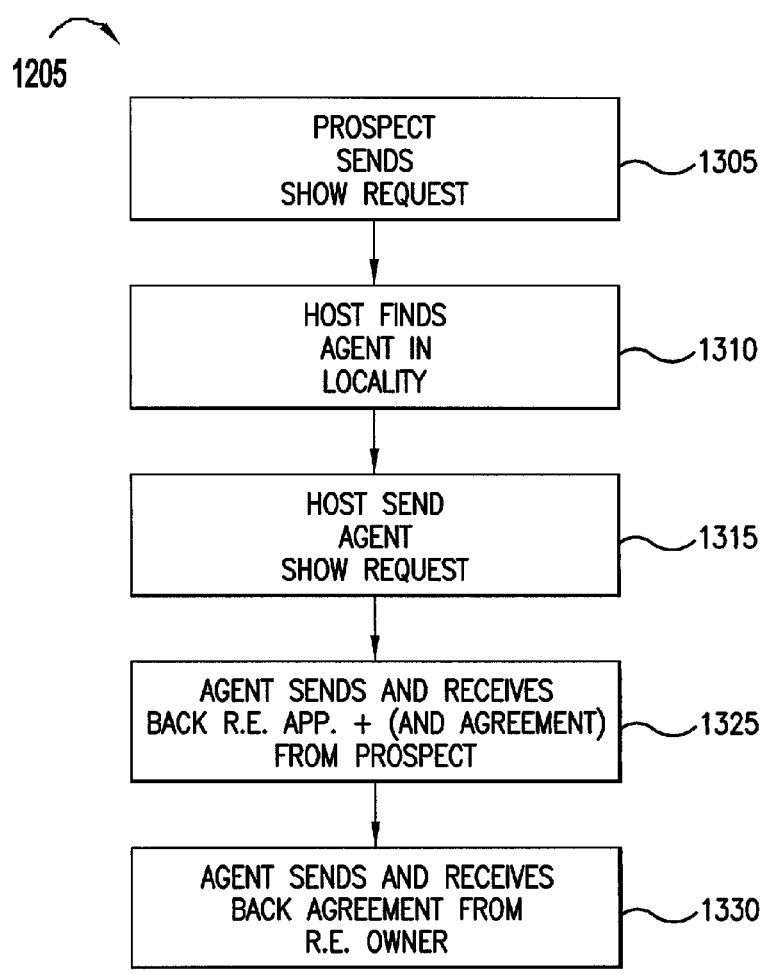
FIG. 13 displays an exemplary process illustrating how an Agent is found, as set forth in step 1205 of FIG. 12.

FIG. 13—Finding an Agent

FIG. 13 displays an exemplary process illustrating how an Agent 120 is found, as set forth in step 1205 of FIG. 12.

In step 1305, the Prospect 105 sends a Show Request. In step 1310, the Host 170 searches for Agents 120 in the locality selected and finds an Agent 120 in the locality. The Agent 120 will likely be the Agent 120 closest to the desired locality.

In step 1315, the Host 170 sends the applicable Agent 120 the Show Request, including Prospect information, match site address, Real Estate Owner 110 information, and property site availability reply. The Agent 120 is also provided with an online link to the Map #1 and Map #2.

In step 1325, the Agent 120 sends and receives back from the Prospect 105 the Real Estate Application and agreement.

In step 1330, the Agent 120 sends and receives back from the Real Estate Owner 120 the agreement.

Figure 14:
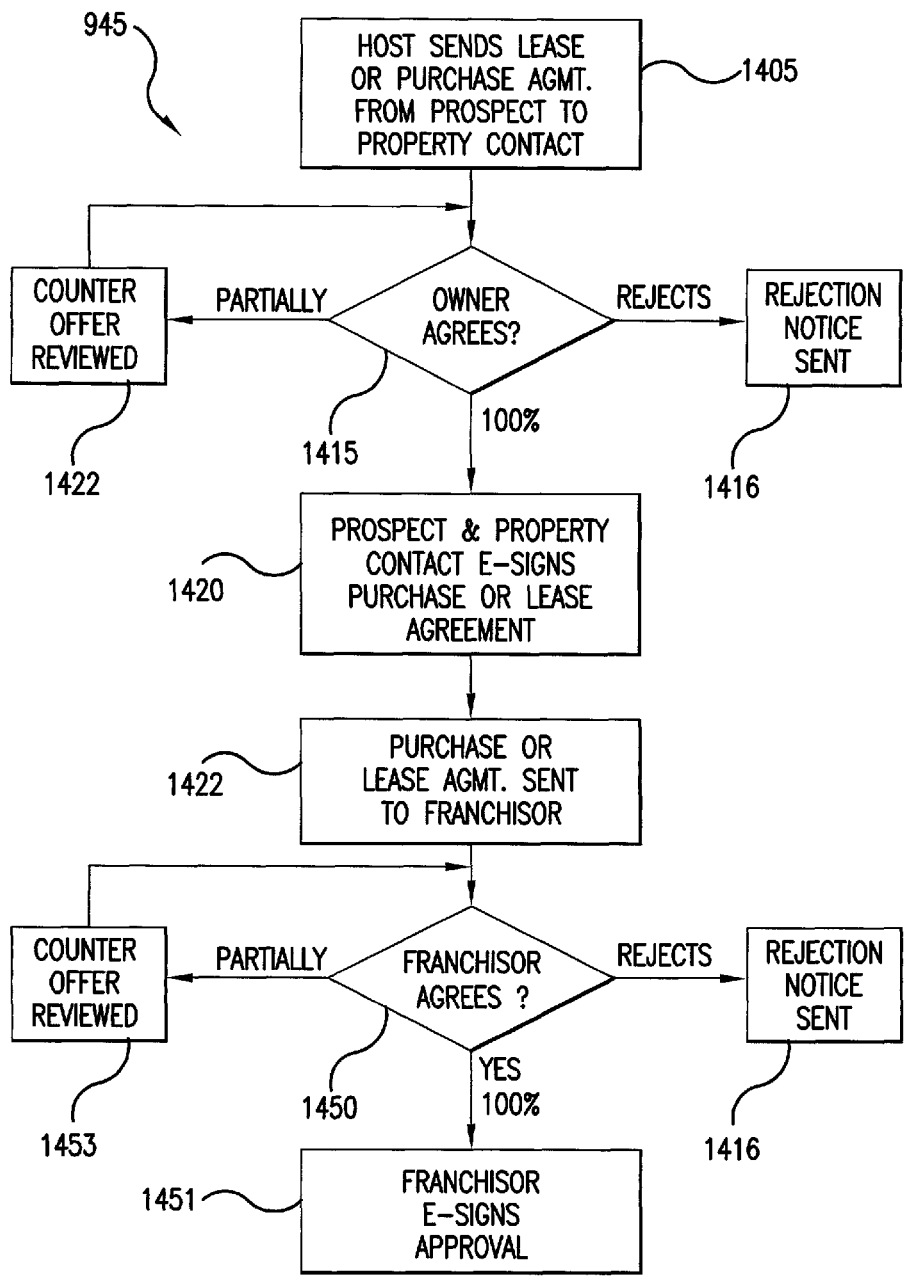
FIG. 14 displays an exemplary process illustrating how a real estate price is negotiated, as set forth in step 945 of FIG. 9.

FIG. 14—Negotiating Real Estate Price

FIG. 14 displays an exemplary process illustrating how a real estate price is negotiated, as set forth in step 945 of FIG. 9.

In step 1405, the Host 170 sends a Real Estate Purchase or Lease Agreement from the Prospect 105 to the Property Contact (usually through the Agent 120). It should be noted that this Agreement, as well as the other forms and agreements in the present invention, are automatically filled by the Host 170 with the information the Host 170 has already acquired. In step 1415 it is determined whether the Real Estate Owner 110 agrees 100%, partially agrees, or rejects the agreement. (This agreement is still subject to Franchisor approval.)

If 100% AGREED, the process moves to step 1420, where the Prospect 105 e-signs the Purchase or Lease Agreement.

If PARTIALLY AGREED, the process moves to step 1422 where the Prospect 105 reviews the signed counter offer from the Real Estate Owner 110. (Note that in steps 1422 and 1451, the Franchisor 115 is agreeing to agreement terms. In step 942 of FIG. 9 above, the Franchisor 115 is approving the site.) The process goes back to step 1415 and is repeated until 100% APPROVED or REJECTED.

If REJECTED, the process moves to step 1416, where a rejection notice is sent.

In step 1420, the Prospect 105 and the Property Contact e-sign the Purchase or Lease Agreement. The process then moves to step 1422, where the Purchase or Lease Agreement is sent to the Franchisor 115. Then, in step 1450, it is determined whether the Franchisor 115 agrees 100%, partially agrees, or rejects.

If 100% AGREED, the process moves to step 1451, where the Franchisor 115 e-signs his approval to the Purchase or Lease Agreement.

If PARTIALLY AGREED, the process moves to step 1453 where the Franchisor 115 reviews the signed counter offer from the Property Owner 110. The process goes back to step 1450 and is repeated until 100% AGREED or REJECTED.

If REJECTED, the process moves to step 1416, where a rejection notice is sent.

Figure 15:
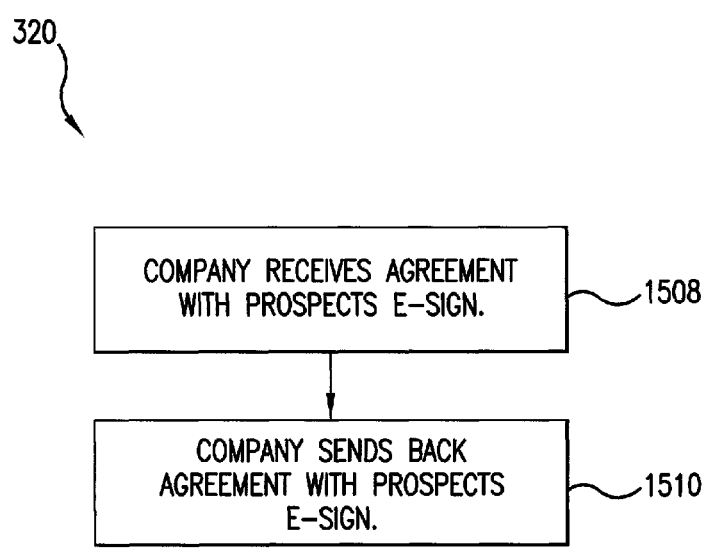
FIG. 15 displays an exemplary process illustrating how the Company signs an agreement with the Prospect, as set forth in step 820 of FIG. 8.

FIG. 15—Company Signs Agreement with Prospect

FIG. 15 displays an exemplary process illustrating how the Company 106 signs the Franchise agreement with the Prospect, as set forth in step 320 of FIG. 3.

In step 1508, the Company 106 receives the Franchise agreement, with the Prospect's e-signature, from the Prospect.

In step 1510, the Company 106 sends back the Franchise agreement, with the Company's 106 added e-signature, to the Prospect.

Figure 16:
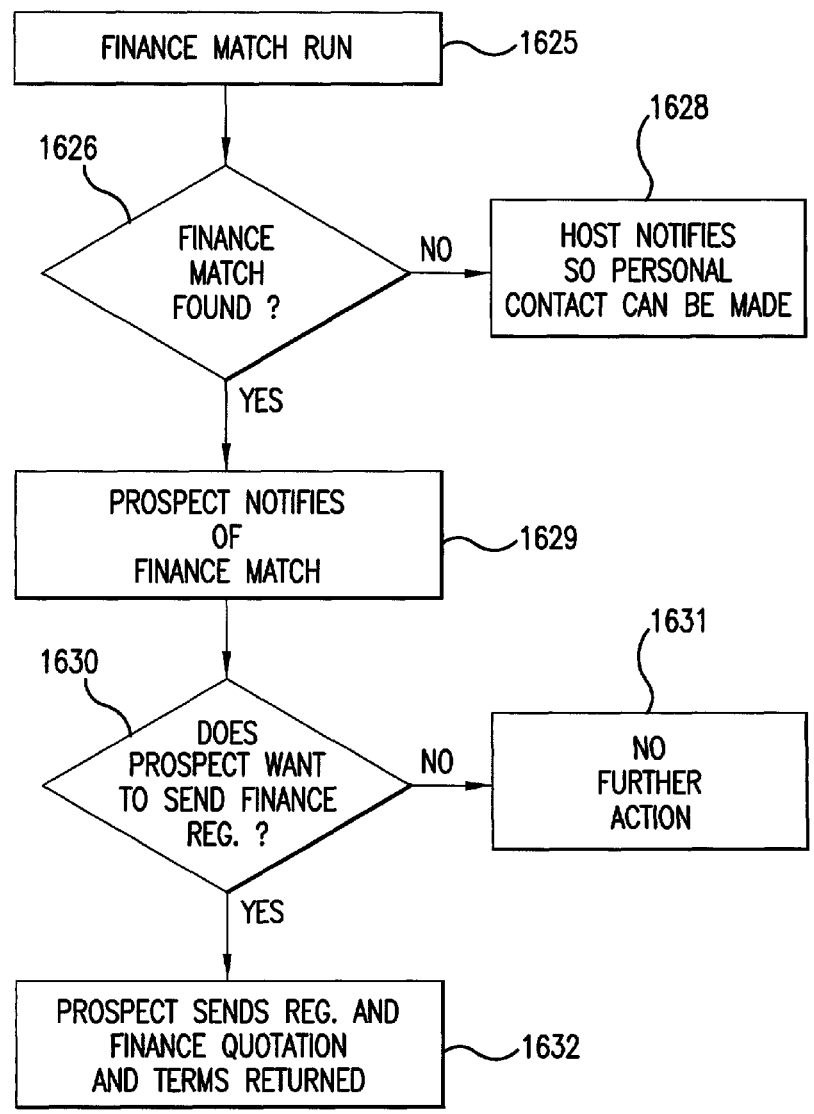
FIG. 16 displays an exemplary process illustrating how Finance Entity issues are addressed, as set forth in FIG. 9.

FIG. 16—Finance Entity Issues

FIG. 16 displays an exemplary process illustrating how Finance Entity issues are addressed, as set forth in FIG. 9.

In step 1625, the Finance Match is run. This process is detailed in FIG. 17.

In step 1626, it is determined if a match was found. If NO, the Host 170 is notified so that a personal contact can be made in step 1628. If YES, the Prospect is notified of the finance matches in step 1629.

In step 1630, it is determined if the Prospect 105 wants to send a finance request. If NO, no further action is taken in step 1631. If YES, the Prospect 105 sends the registration and finance quotation, and the terms are returned by the Company 106 in step 1632. This process is detailed in FIG. 18. (In an embodiment, if the Prospect 105 is approved, the Finance entity or Host 170 can also send the finance agreements to the Prospect 105, and the Prospect 105 can complete the agreements and send them back.)

Figure 17:
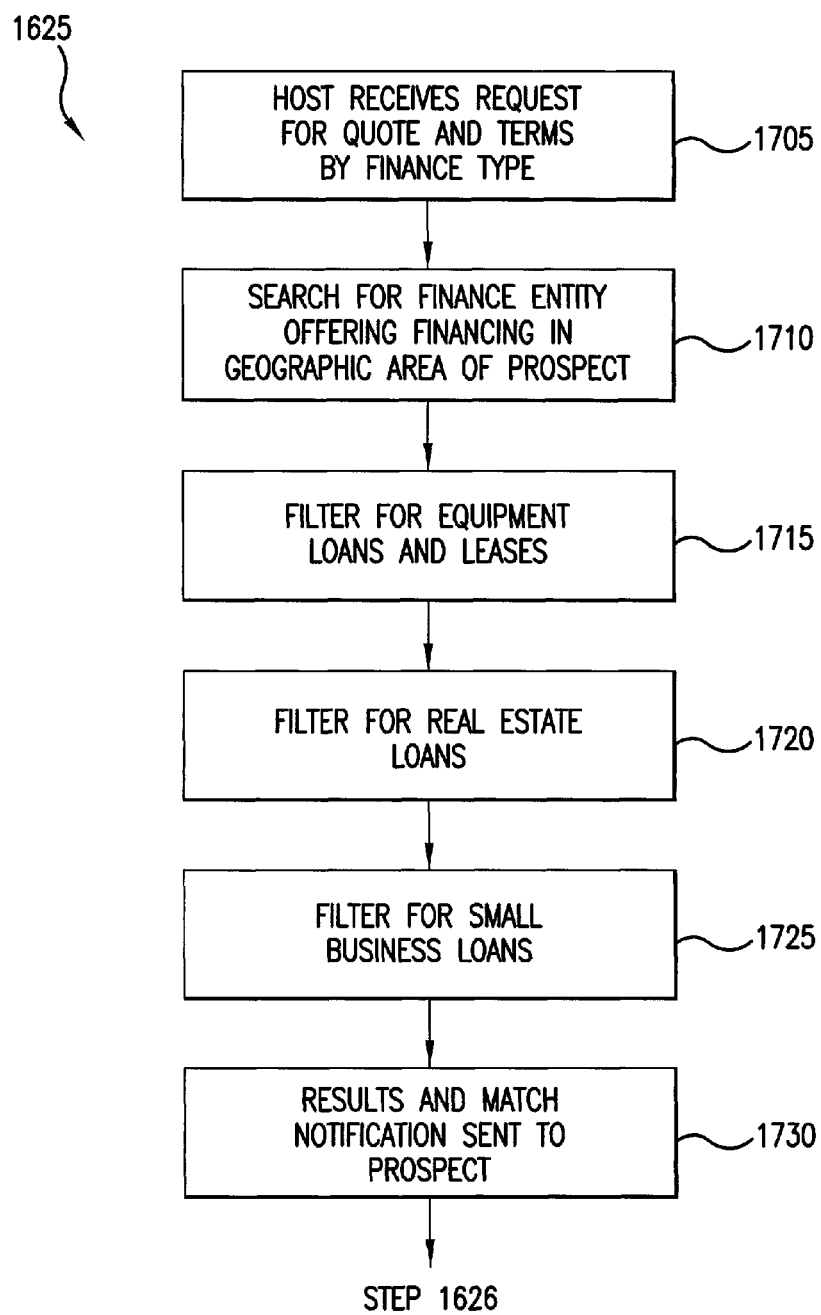
FIG. 17 displays an exemplary process illustrating how the Finance Match is run, as set forth in step 1625 of FIG. 16.

FIG. 17—Finance Match Run

FIG. 17 displays an exemplary process illustrating how the Finance Match is run, as set forth in step 1625 of FIG. 16.

In step 1705, the Host 170 receives a request for the quote and terms by the financing type. In step 1710, the search is run for a Finance Entity offering financing in the geographic area of the Prospect 105. In step 1715, the Match is filtered for equipment loans and leases. In step 1720, the Match is filtered for real estate loans. In step 1725, the Match is filtered for small business loans.

In step 1730, the Results from the Finance Entities offering equipment, real estate and/or small business loans are shown, and the Match notifications are sent to the Prospect.

Figure 18:
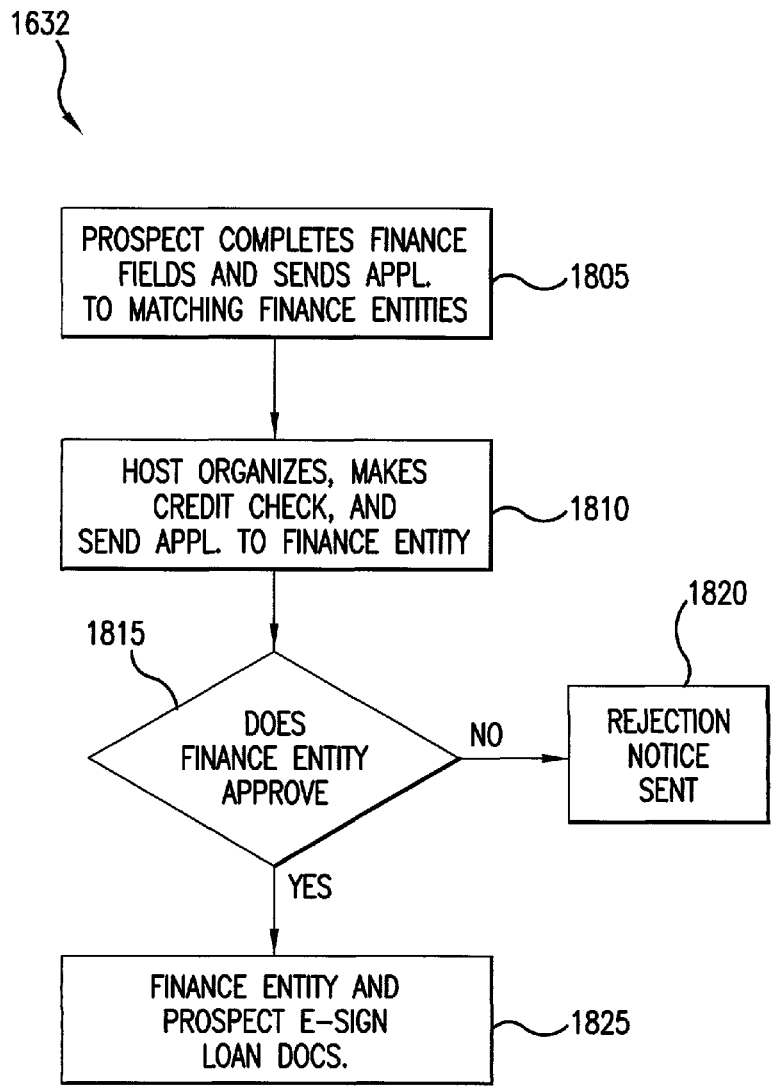
FIG. 18 displays an exemplary process illustrating how the application is processed, as set forth in step 1632 of FIG. 16.

FIG. 18—Application Processed

FIG. 18 displays an exemplary process illustrating how the application is processed, as set forth in step 1632 of FIG. 16.

In step 1805, the Prospect 105 completes the finance fields and sends the application request to the matching Finance Entities. In step 1810, the Host 170 organizes the application and Franchise information, does a credit check, and sends the application to the Finance Entity.

The application is organized by organizing the Prospect, Finance, Real Estate, Supplier, and other Franchise-related information.

The credit check can be done as follows: when an application for a Franchise is made, before the Host 170 sends the application to the Franchisor 115, the Host 170 sends the Prospect's information to a credit bureau for a credit report or rating and if required a background check. The information returned is sent to the Franchisor 115. In one embodiment, if the Franchise, loan, and real estate applications are done within three months of one another, only one credit report is made.

In step 1815, it is determined if the Finance Entity approves the application. If NO, a rejection notice is sent in step 1820. If YES, the Finance Entity and the Prospect 105 e-sign the loan documents.

FIG. 19—Screen Shots

FIG. 19 displays exemplary screen shots of the present invention.

Figure 19A:
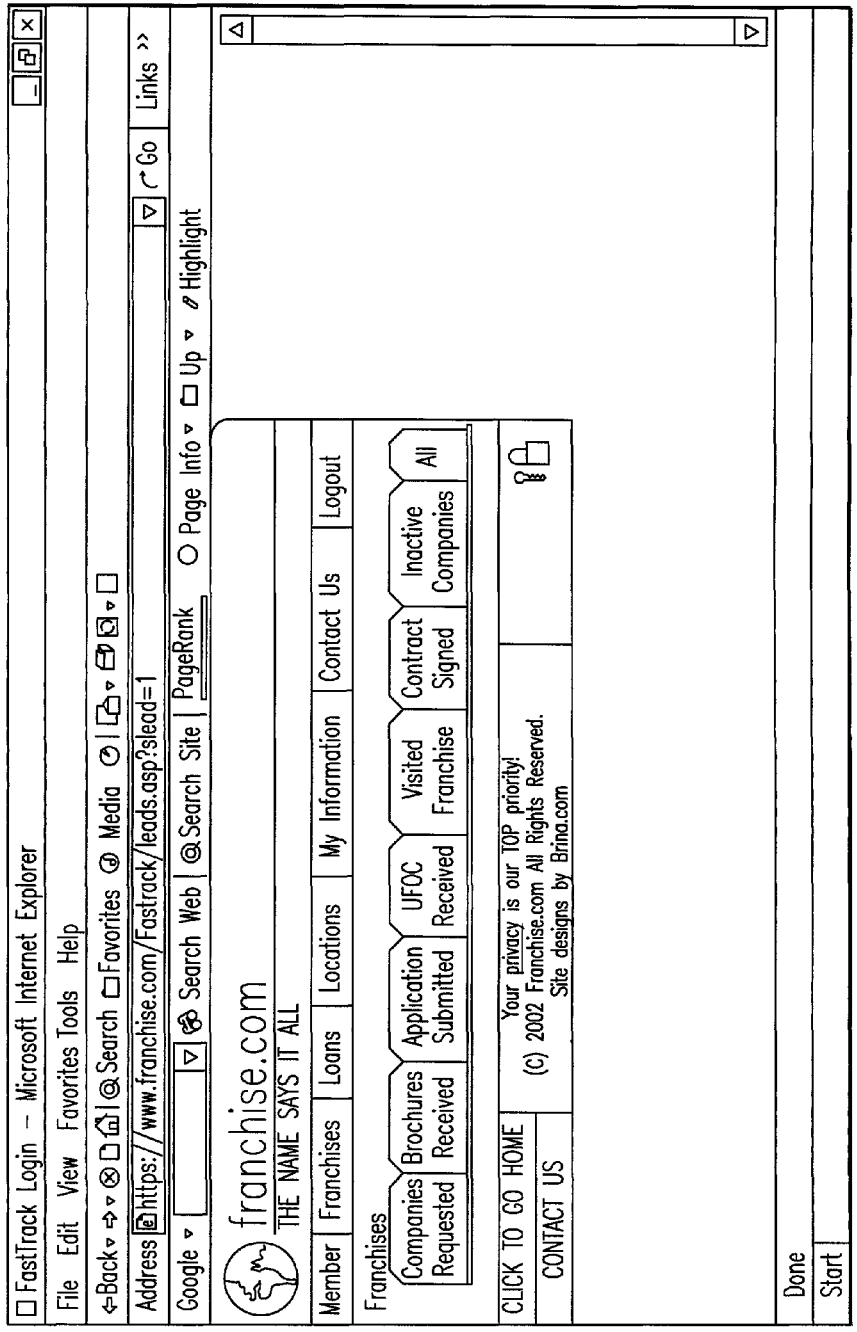

FIG. 19A displays the Prospect Account. FIGS. 19B, 19C, and 19D display the Prospect Registration (found by using the "My Information" tab of FIG. 19A).

Figure 19E:

FIG. 19E displays the Company Account. FIGS. 19F, 19G, and 19H display the Company Registration (found by using the "My Account" tab of FIG. 19E).

What is claimed is:

1. An electronic system for the franchise industry, comprising:
   a server coupled to a network;
   a user terminal coupled to the network;
   an application coupled to the server, wherein the application is configured to:
      receive prospect information for a prospect account, the prospect information comprising:
         prospect identification information;
         financing information; and
         real estate information;
      receive company information for a company account, the company information comprising:
         company identifying information;
         company geographic target market information;
         company product or service category information;
         company documents; and
         company links to lead records and online documents;
      process an information request between the prospect and the company; and
      answer the information request by utilizing the prospect information and the company information.

2. The system of claim 1, further comprising receiving approval for: sending
   electronic documents; or
   receiving electronic documents;
   or any combination thereof.

3. The system of claim 1, wherein the information is automatically updated when information is sent by the prospect or the company or both.

4. The system of claim 1, wherein the company comprises:
   franchisors, finance entities, or real estate entities; or any combination thereof.

5. The system of claim 4, wherein the finance entities comprise: lenders, loan brokers, or credit reporting agencies; or any combination thereof.

6. The system of claim 4, wherein the real estate entities comprise:
   real estate owners or real estate agents or both.

7. The system of claim 1, wherein the application is further configured to run a site match matching real estate needs of the prospect with available real estate, which matching comprises franchisor site requirements or demographic requirements or both.

8. The system of claim 7, wherein the application is further configured to facilitate arrangements to: show a site; purchase a site; or lease a site; or any combination thereof.

9. The system of claim 7, wherein the site match includes:
   searching for real estate within a selected radius of a location of the prospect.

10. The system of claim 9, further comprising: if real estate is not found within the selected radius, searching for real estate within a wider selected radius.

11. The system of claim 9, wherein the prospect is a franchise, and the site match includes filtering out a real estate location if a franchise currently exists within the selected radius.

12. The system of claim 1, wherein the application is further configured to find a real estate agent to represent the prospect.

13. The system of claim 1, wherein the application is further configured to run a loan match for the prospect to match the prospect to available financing.

14. The system of claim 1, wherein the governmental legal disclosure requirements related to the information request for a franchise disclosure document are met.

15. The system of claim 1, wherein the application:
   delivers prioritized on line email lists and tracking results;
   provides information on whether the prospect does not wish to be contacted about additional companies of interest; or
   indicates whether the prospect is active or inactive; or
   any combination of two or more thereof.

16. The system of claim 1, wherein the processing of the information request facilitates viewing of a UFOC of the company.

17. The system of claim 1, wherein e-signatures are utilized.

18. The system of claim 1, wherein the financing information includes information on: equipment loans; real estate loans, or small business loans; or any combination thereof.

19. The system of claim 1, wherein the financing information includes a credit rating for the prospect or a background check for the prospect or both.

20. The system of claim 1, wherein the application is further configured to: deliver an e-receipt when the answer to the information request is accessed by the prospect or the company.

21. The system of claim 20, wherein the answer to the information request is a UFOC.

22. The system of claim 1, wherein the application facilitates agreement signing.

23. The system of claim 1, wherein the financing information comprises business loan and equipment loan information.

24. The system of claim 1, wherein the company account and the prospect account both include a report log, which maintains a log of all communications and documents sent from the company and the prospect.

25. The system of claim 24, wherein the report log includes the date the prospect was given UFOC access and the version the prospect was allowed access.

26. The system of claim 1, wherein the processing is performed by a third party that is not the prospect or the company.

27. An electronic method for the franchise industry, comprising:
    receiving prospect information for a prospect account, the prospect information comprising:
        prospect identification information;
        financing information; and
        real estate information;
    receiving company information for a company account, the company information comprising:
        company identifying information;
        company geographic target market information;
        company product or service category information;
        company documents; and
        company links to lead records and online documents; and
    processing an information request between the prospect and the company, the information request processed by utilizing the prospect information and the company information.

28. The method of claim 27, wherein the company comprises: franchisors, finance entities, or real estate entities, or any combination thereof.

29. The method of claim 28, wherein the real estate entities comprise real estate owners or real estate agents or both.

30. The method of claim 29, wherein the processing of the information request includes providing real estate information when real estate is needed by the prospect.

31. The method of claim 29, wherein the processing of the information request includes running a site match matching real estate needs of the prospect with available real estate, which matching comprises franchisor site requirements or demographic requirements or both.

32. The method of claim 31, wherein the site match includes: searching for real estate within a selected radius of a location of the prospect.

33. The method of claim 32, further comprising:
    if real estate is not found within the selected radius, searching for real estate within a wider selected radius.

34. The method of claim 32, wherein the prospect is a franchise, the site match includes filtering out a real estate location if a franchise currently exists within the selected radius.

35. The method of claim 29, wherein the processing of the information request includes making arrangements to: show a site; purchase a site; or lease a site; or any combination thereof.

36. The method of claim 29, wherein the processing of the information request includes finding a real estate agent to represent the prospect.

37. The method of claim 27, wherein the finance entities comprise: lenders, loan brokers, or credit reporting agencies, or any combination thereof.

38. The method of claim 37, wherein the processing of the information request includes providing financing information.

39. The method of claim 38, wherein the financing information includes information on: equipment loans; real estate loans, or small business loans; or any combination thereof.

40. The method of claim 38, wherein the financing information includes a credit rating for the prospect or a background check for the prospect or both.

41. The method of claim 37, wherein the processing of the information request includes running a loan match.

42. The method of claim 27, further comprising meeting governmental legal disclosure requirements related to the information request for a franchise disclosure document.

43. The method of claim 27, further comprising:
    obtaining approval to receive electronic documents or send electronic documents or both.

44. The method of claim 43, updating the information when additional information is sent.

45. The method of claim 27, further comprising:
    delivering prioritized online email lists and tracking results;
    providing information on whether the prospect does not wish to be contacted about additional companies of interest; or
    indicating whether the prospect is active or inactive; or
    any combination of two or more thereof.

46. The method of claim 27, wherein the processing of the information request facilitates viewing of a UFOC of the company.

47. The method of claim 27, further comprising obtaining an e-signature.

48. The method of claim 27, further comprising:
    delivering an e-receipt when the answer to the information request is accessed by the prospect or the company.

49. The method of claim 48, wherein the answer to the information request is a UFOC.

50. The method of claim 27, further comprising facilitating agreement signing.

51. The method of claim 27, wherein the financing information comprises business loan and equipment loan information.

52. The method of claim 27, wherein the company account and the prospect account both include a report log, which maintains a log of all communications and documents sent from the company and the prospect.

53. The method of claim 52, wherein the report log includes the date the prospect was given UFOC access and the version the prospect was allowed access.

54. The method of claim 27, wherein the processing is performed by a third party that is not the prospect or the company.

55. An electronic system for the franchise industry, comprising:
    a server coupled to a network;
    a user terminal coupled to the network;
    an application coupled to the server, wherein the application is configured to:
        receive information regarding prospect's real estate needs:
        match a prospect's real estate needs to information regarding available real estate which matches franchisor site requirements or demographic requirements or both;
        notify a prospect regarding any site matches; and
        determine if a company approves of a site match.

56. The system of claim 55, wherein matching the prospect's real estate needs to information regarding available real estate comprises:
searching for geographic locations in prospect's area, based on a selected radius, to find location matches;
filtering the location matches by the company's demographics requirements to find location/requirement matches;
filtering the location/requirement matches by company territory restrictions and existing units to obtain locality/requirement/non-conflicting site matches;
if no site matches were found, increasing the selected radius and repeating the above steps.

57. The system of claim 55, wherein the company comprises: franchisors, finance entities, or real estate entities; or any combination thereof.

58. The system of claim 55, wherein the finance entities comprise: lenders, loan brokers, or credit reporting agencies, or any combination thereof.

59. The system of claim 55, wherein the real estate entities comprise real estate owners or real estate agents or both.

60. The system of claim 55, wherein the application is further configured to run a site match matching real estate needs of the prospect with available real estate.

61. The system of claim 55, wherein the application is further configure to facilitate arrangements to show a site.

62. The system of claim 55, wherein the application is further configured to find real estate agent to represent the prospect.

* * * * *

UNITED STATES PATENT AND TRADEMARK OFFICE
CERTIFICATE OF CORRECTION

PATENT NO.         : 8,380,527 B2
APPLICATION NO.    : 10/113568
DATED              : February 19, 2013
INVENTOR(S)        : Nancy K. Fisher It is certified that error appears in the above-identified patent and that said Letters Patent is hereby corrected as shown below:

In the Claims:

Column 20, Line 10, Claim 61:

After "application is further"
Delete "configure" and
Insert -- configured --.

Signed and Sealed this
Twenty-fifth Day of June, 2013

Teresa Stanek Rea
*Acting Director of the United States Patent and Trademark Office*